United States Patent
Lee et al.

(10) Patent No.: US 9,264,782 B2
(45) Date of Patent: Feb. 16, 2016

(54) METHOD AND SYSTEM FOR PROVIDING REALISTIC BROADCASTING IMAGE

(71) Applicant: Electronics and Telecommunications Research Institute, Daejeon (KR)

(72) Inventors: Gwang Soon Lee, Daejeon (KR); Eung Don Lee, Daejeon (KR); Won Sik Cheong, Daejeon (KR); Nam Ho Hur, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/164,000

(22) Filed: Jan. 24, 2014

(65) Prior Publication Data
US 2014/0215547 A1 Jul. 31, 2014

(30) Foreign Application Priority Data

Jan. 25, 2013 (KR) .................. 10-2013-0008627
Feb. 20, 2013 (KR) .................. 10-2013-0018190

(51) Int. Cl.
| | |
|---|---|
| H04N 7/01 | (2006.01) |
| H04N 21/63 | (2011.01) |
| H04N 21/81 | (2011.01) |
| H04N 21/2343 | (2011.01) |
| H04N 7/173 | (2011.01) |
| H04N 21/2385 | (2011.01) |

(52) U.S. Cl.
CPC ..... *H04N 21/631* (2013.01); *H04N 21/234327* (2013.01); *H04N 21/816* (2013.01); *H04N 7/17309* (2013.01); *H04N 21/2385* (2013.01)

(58) Field of Classification Search
CPC ................ H04N 7/17309; H04N 21/2385
USPC ............... 725/126; 375/240, 240.12, 240.01
See application file for complete search history.

(56) References Cited

U.S. PATENT DOCUMENTS

2011/0176616 A1* 7/2011 Luthra ............... H04N 13/0048
375/240.16
2014/0168512 A1* 6/2014 Suh ..................... H04N 21/845
348/441

FOREIGN PATENT DOCUMENTS

KR 10-2011-0101099 A 9/2011

* cited by examiner

*Primary Examiner* — Jefferey Harold
*Assistant Examiner* — Omer Khalid

(57) ABSTRACT

A method of providing a realistic broadcasting image including an ultra high definition (UHD) image, the method including generating a first encoding stream from a high definition (HD) image, generating a second encoding stream from at least one of a UHD image and an image restored from the first encoding stream, generating a third encoding stream from at least one of the UHD image and an image restored from the second encoding stream, generating a first transmission stream by applying at least one of packetization, synchronization, and multiplying to the first encoding stream and the second encoding stream, generating a second transmission stream by applying at least one of packetization and synchronization to the third encoding stream, transmitting the first transmission stream via a first transmission channel, and transmitting the second transmission stream via a second transmission channel having a lower transmission capacity than the first transmission channel.

20 Claims, 26 Drawing Sheets

METHOD AND SYSTEM FOR PROVIDING REALISTIC BROADCASTING IMAGE

CROSS-REFERENCE TO RELATED APPLICATIONS

This application claims the priority benefit of Korean Patent Application No. 10-2013-0008627, filed on Jan. 25, 2013, and Korean Patent Application No. 10-2013-0018190, filed on Feb. 20, 2013, in the Korean Intellectual Property Office, the disclosures of which are incorporated herein by reference.

BACKGROUND

1. Field of the Invention

The present invention relates to a method and system for providing a realistic broadcasting image, and more particularly, to technology for concurrently providing a high definition (HD) image and an ultra high definition (UHD) image by appropriately distributing encoding streams corresponding to a UHD image, and transmitting the distributed encoding streams via a first transmission channel and a second transmission channel. The realistic broadcasting image includes a UHD image, a three-dimensional (3D) image, and a panorama image.

2. Description of the Related Art

A method and system for providing a realistic broadcasting image includes transmitting encoding streams corresponding to a high definition (HD) image via a base layer and transmitting encoding streams corresponding to an ultra high definition (UHD) image via an enhancement layer. In particular, the encoding streams corresponding to the UHD image are transmitted by being divided into the base layer and the enhancement layer.

SUMMARY

According to an aspect of the present invention, there is provided a method of providing a realistic broadcasting image including an ultra high definition (UHD) image, the method including generating a first encoding stream from a high definition (HD) image, generating a second encoding stream from at least one of a UHD image and an image restored from the first encoding stream, generating a third encoding stream from at least one of the UHD image or an image restored from the second encoding stream, generating a first transmission stream by applying at least one of packetization, synchronization, and multiplexing to the first encoding stream and the second encoding stream, generating a second transmission stream by applying at least one of packetization and synchronization to the third encoding stream, transmitting the first transmission stream via a first transmission channel, and transmitting the second transmission stream via a second transmission channel having a lower transmission capacity than the first transmission channel.

The generating of the first encoding stream may include obtaining the HD image by reducing a resolution of the UHD image, and generating the first encoding stream by encoding the HD image.

The generating of the second encoding stream may include generating a decoded image by decoding an image corresponding to the first encoding stream, obtaining a restored UHD image, differing from the UHD image, by expanding a resolution of the decoded image and converting a scanning method as necessary, and generating the second encoding stream by reference encoding the restored UHD image and the UHD image based on an inter-picture prediction method.

The generating of the third encoding stream may include generating a decoded image by decoding an image corresponding to the second encoding stream, and generating the third encoding stream by reference encoding the decoded image and the UHD image.

The generating of the second encoding image may further include obtaining the HD image by reducing the resolution of the UHD image, generating a decoded image by decoding an image corresponding to the first encoding stream, and generating the second encoding stream by reference encoding the decoded image and the HD image.

The generating of the third encoding may further include generating a decoded image by decoding an image corresponding to the second encoding stream, obtaining a restored UHD image, differing from the UHD image, by expanding a resolution of the decoded image and converting a scanning method as necessary, and generating the third encoding stream by reference encoding the restored UHD image and the UHD image.

The method of providing the realistic broadcasting image including the UHD image may further include performing error correction encoding on each of the first transmission stream and the second transmission stream.

The method of providing the realistic broadcasting image including the UHD image may further include receiving the first transmission stream via the first transmission channel, receiving the second transmission stream via the second transmission channel, generating the first encoding stream and the second encoding stream by separating the first transmission stream, generating the third encoding stream from the second transmission stream, generating the HD image from the first encoding stream, generating at least one of a semi-UHD image and another HD image, differing from the HD image, from the first encoding stream and the second encoding stream, and generating the UHD image from the first encoding stream, the second encoding stream, and the third encoding stream.

The receiving of the first transmission stream may include generating the first transmission stream by channel decoding a signal received via the first transmission channel, and the receiving of the second transmission stream comprises generating the second transmission stream by channel decoding a signal received via the second transmission channel.

According to an aspect of the present invention, there is provided a method of providing a realistic broadcasting image including a UHD image, the method including generating a first encoding stream from an HD image, generating a second encoding stream from at least one of a UHD image and an image restored from the first encoding stream, generating a third encoding stream and a fourth encoding stream by separating the second encoding stream, generating a first transmission stream by applying at least one of packetization, synchronization, and multiplexing to the first encoding stream and the third encoding stream, generating a second transmission stream by applying at least one of packetization and synchronization to the fourth encoding stream, transmitting the first transmission stream via a first transmission channel, and transmitting the second transmission stream via a second transmission channel having a lower transmission capacity than the first transmission channel.

The generating of the first encoding stream may include obtaining the HD image by reducing a resolution of the UHD image, and generating the first encoding stream by encoding the HD image.

The generating of the second encoding stream may include generating a decoded image by decoding an image corresponding to the first encoding stream, obtaining a restored UHD image, differing from the UHD image, by expanding a resolution of the decoded image and converting a scanning method as necessary, and generating the second encoding stream by reference encoding the restored UHD image and the UHD image based on an inter-picture prediction method.

The generating of the first transmission stream may further include performing error correction encoding on the first transmission stream, and the generating of the second transmission stream further comprises performing error correction encoding on the second transmission stream.

The method of providing a realistic broadcasting image including a UHD image may further include receiving the first transmission stream via the first transmission channel, receiving the second transmission stream via the second transmission channel, generating the first encoding stream and the third encoding stream by separating the first transmission stream, generating the fourth encoding stream from the second transmission stream, generating the second encoding stream by combining the third encoding stream and the fourth encoding stream, generating the HD image from the first encoding stream, and generating the UHD image from the first encoding stream and the second encoding stream.

According to an aspect of the present invention, there is provided a method of providing a realistic broadcasting image including a three-dimensional (3D) image and a panorama image, the method including generating a plurality of encoding streams corresponding to a plurality of images from the plurality of images included in at least one of a 3D image and a panorama image, generating a first transmission stream by applying at least one of packetization, synchronization, and multiplexing to a first encoding stream group extracted from the plurality of encoding streams based on a predetermined condition, generating a second transmission stream by applying at least one of packetization and synchronization to a second encoding stream group extracted from the plurality of encoding streams to differ from the first encoding stream group, transmitting the first transmission stream via a first transmission channel, and transmitting the second transmission stream via a second transmission channel having a lower transmission capacity than the first transmission channel.

The method of providing the realistic broadcasting image including the 3D image and the panorama image may further include receiving the first transmission stream via the first transmission channel, receiving the second transmission stream via the second transmission channel, obtaining the plurality of encoding streams from the first transmission stream and the second transmission stream, generating the plurality of images corresponding to the plurality of encoding streams, and generating at least one of the 3D image and the panorama image by combining the plurality of images.

According to an aspect of the present invention, there is provided a system for providing a realistic broadcasting image including a UHD image, the system including a first image encoder to generate a first encoding stream from an HD image, a second image encoder to generate a second encoding stream from at least one of a UHD image and an image restored from the first encoding stream, a third image encoder to generate a third encoding stream from at least one of the UHD image and an image restored from the second encoding stream, a multiplexer to generate a first transmission stream by applying at least one of packetization, synchronization, and multiplexing to the first encoding stream and the second encoding stream, and generate a second transmission stream by applying at least one of packetization and synchronization to the third encoding stream, and a transmitter to transmit the first transmission stream via a first transmission channel, and transmit the second transmission stream via a second transmission channel having a lower transmission capacity than the first transmission channel.

The system for providing the realistic broadcasting image including the UHD image may further include a receiver to receive the first transmission stream via the first transmission channel, and receive the second transmission stream via the second transmission channel, a demultiplexer to generate the first encoding stream and the second encoding stream by separating the first transmission stream, and generate the third encoding stream from the second transmission stream, a first image decoder to generate the HD image from the first encoding stream, a second image decoder to generate at least one of a semi-UHD image and another HD image differing from the HD image from the first encoding stream and the second encoding stream, and a third image decoder to generate the UHD image from the first encoding stream, the second encoding stream, and the third encoding stream.

According to an aspect of the present invention, there is provided a system for providing a realistic broadcasting image including a UHD image, the system including a first image encoder to generate a first encoding stream from an HD image, a second image encoder to generate a second encoding stream from at least one of a UHD image and an image restored from the first encoding stream, a stream separator to generate a third encoding stream and a fourth encoding stream by separating the second encoding stream, a multiplexer to generate a first transmission stream by applying at least one of packetization, synchronization, and multiplexing to the first encoding stream and the third encoding stream, and generate a second transmission stream by applying at least one of packetization and synchronization to the fourth encoding stream, and a transmitter to generate the first transmission stream via a first transmission channel, and transmit the second transmission stream via a second transmission channel having a lower transmission capacity than the first transmission channel.

According to an aspect of the present invention, there is provided a system for providing a realistic broadcasting image including a 3D image and a panorama image, the system including a plurality of image encoders to generate a plurality of encoding streams corresponding to a plurality of images from the plurality of images included in at least one of a 3D image and a panorama image, a multiplexer to generate a first transmission stream by applying at least one of packetization, synchronization, and multiplexing to a first encoding stream group extracted from the plurality of encoding streams based on a predetermined condition, and generate a second transmission stream by applying at least one of packetization and synchronization to a second encoding stream group extracted from the plurality of encoding streams to differ from the first encoding stream group, and a transmitter to transmit the first transmission stream via the first transmission channel, and transmit the second transmission stream via a second transmission channel having a lower transmission capacity than the first transmission channel.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
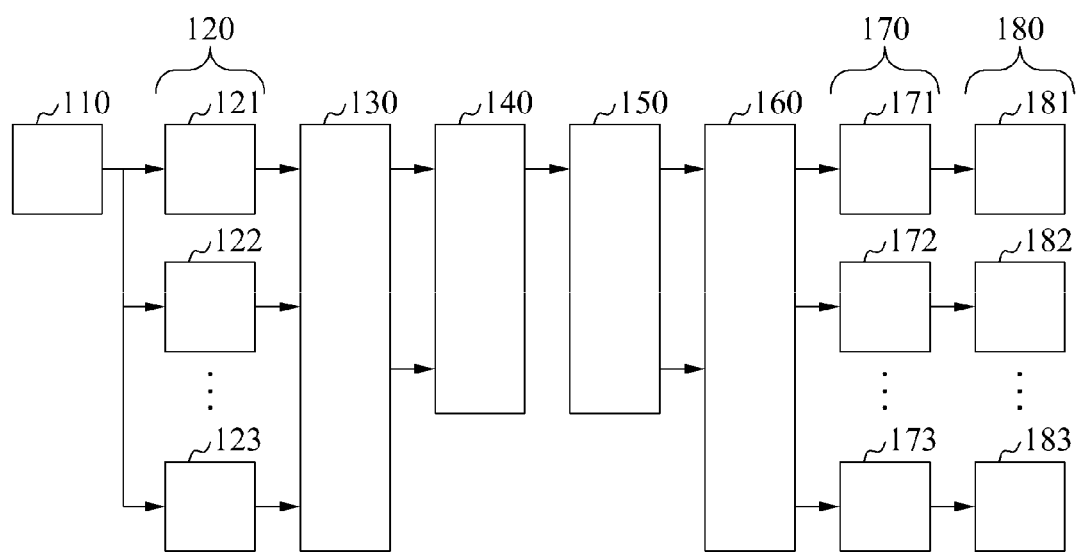
FIG. 1 is a diagram illustrating a system for providing a realistic broadcasting image according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating a system for providing a realistic broadcasting image according to an embodiment of the present invention.

Referring to FIG. 1, the system for providing the realistic broadcasting image includes a transmission system and a reception system.

The transmission system includes a plurality of image encoders 120 for generating a plurality of encoding streams from an ultra high definition (UHD) image 110, a multiplexer 130 for generating a plurality of transmission streams by applying at least one of packetization, synchronization, and multiplexing to each of the plurality of encoding streams, and a transmitter 140 for appropriately distributing and transmitting the plurality of transmission streams via differing channels. In this example, the plurality of image encoders 120 includes a first image encoder 121, a second image encoder 122, and a third image encoder 123, and the first image encoder 121 generates a first encoding stream from a high definition (HD) image, by including a down-scaler for reducing a resolution of the UHD image 110 and obtaining the HD image. The second encoder 122 or the third image encoder 123 generates, from the UHD image 110, a second encoding stream or a third encoding stream through reference encoding based on an inter-picture prediction method, by including an up-scaler for decoding an image corresponding to the first encoding stream, expanding a resolution of decoded images 180, 181, 182, and 183, converting a scanning method as necessary, and obtaining the UHD image. Also, the transmitter 140 includes an error correction encoder for performing error correction encoding on the plurality of transmission streams and a modulator. Further descriptions pertaining to the transmitter will be provided later.

The reception system is connected to the transmission system via a transmission channel, and includes a receiver 150 for receiving a plurality of transmission streams via differing channels, a demultiplexer 160 for generating an encoding stream corresponding to the plurality of transmission streams, and a plurality of image decoders 170 for generating an image corresponding to a plurality of encoding streams. The plurality of image decoders 170 includes a first image decoder 171, a second image decoder 172, and a third image decoder 173. In particular, the second image decoder 172 or the third image decoder 173 generates an image corresponding to each of a second encoding stream or a third encoding stream through reference decoding, or decoding by including an up-scaler for expanding a resolution of an image corresponding to a first encoding stream, converting a scanning method as necessary, and obtaining a UHD image. Also, the receiver 150 demodulates the plurality of transmission streams received via the differing channels, and includes a demodulator for channel decoding and an error correction decoder.

Figure 2:
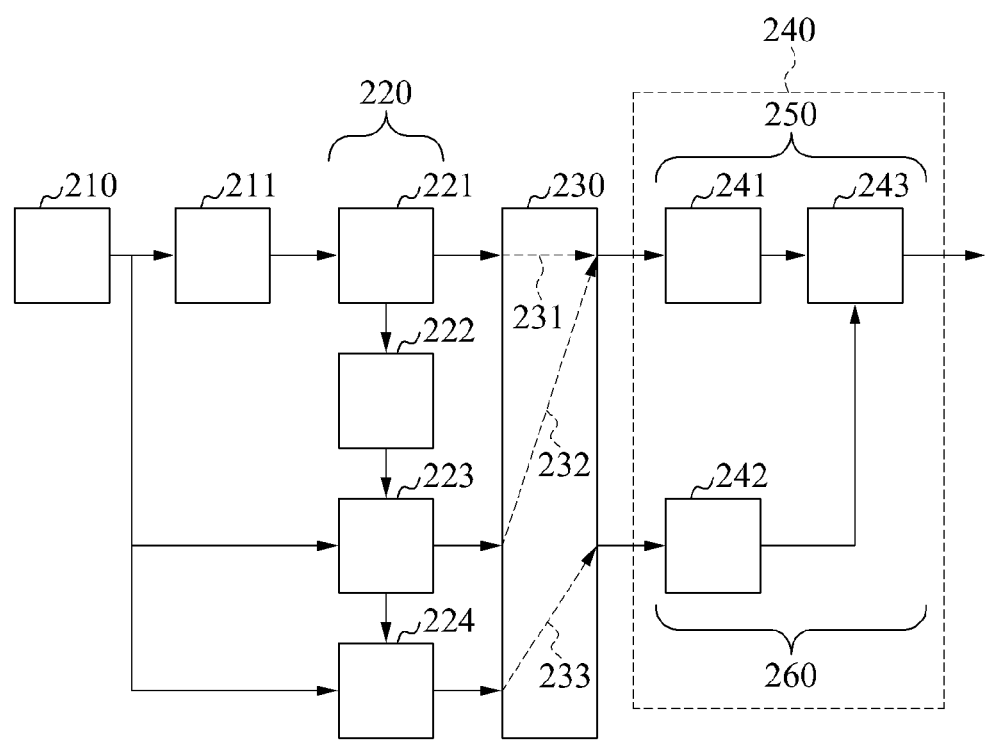
FIG. 2 is a diagram illustrating a first transmission system for transmitting a realistic broadcasting image including an ultra high definition (UHD) image according to an embodiment of the present invention.

FIG. 2 is a diagram illustrating a first transmission system for transmitting a realistic broadcasting image including a UHD image according to an embodiment of the present invention.

Referring to FIG. 2, the first transmission system includes a plurality of image encoders 220 for generating a plurality of encoding streams from a UHD image 210, a multiplexer 230 for generating a plurality of transmission streams by applying at least one of packetization, synchronization, and multiplexing to each of the plurality of encoding streams, and a transmitter 240 for appropriately distributing and transmitting the plurality of transmission streams by via differing channels. In this example, the plurality of image encoders 220 includes a first image encoder 221, a second image encoder 223, and a third image encoder 224. In particular, the first image encoder 221 generates a first encoding stream, from an HD image, by including a down-scaler 211 for reducing a resolution of the UHD image 210 and obtaining the HD image. The second encoder 223 generates a second encoding stream through reference encoding based on an inter-picture prediction method, by including an up-scaler 222 for decoding an image corresponding to the first encoding stream, expanding a resolution of the decoded image, converting a scanning method as necessary, and obtaining a restored UHD image differing from the UHD image 210. In this example, the converting of the scanning method refers to converting an image in an interlaced scanning method into an image in a progressive scanning method, and encoding efficiency may be enhanced by reference encoding through matching scanning methods of a decoded image and a UHD image. For example, reference coding based on the inter-picture prediction method may be performed to reduce a number of bits to be encoded. In particular, an "I" picture of the second image encoder 223 is reference encoded to reduce complexity of the second image encoder because a great number of bits is generated when encoding the "I" picture in high efficiency video coding (HEVC). Further descriptions pertaining to the reference encoding will be provided later. Also, the third image encoder 224 generates a third encoding stream by reference encoding a decoded image obtained by decoding an image corresponding to the second encoding stream and the UHD image 210.

In particular, the first encoding stream may correspond to an HD image, the first encoding stream and the second encoding stream may correspond to a semi-UHD image, or the first encoding stream, the second encoding stream, and the third encoding stream may correspond to a UHD image. Further, the first encoding stream, the second encoding stream, and the third encoding stream may be generated in differing forms based on an implementation method, for example, an elementary stream (ES), a packetized elementary stream (PES), and a transport stream (TS).

The multiplexer 230 generates a first transmission stream by applying at least one of packetization, synchronization, and multiplexing to the first encoding stream 231 and the second encoding stream 232, and generates a second transmission stream by applying at least one of packetization and synchronization to the third encoding stream 233.

The transmitter 240 transmits the first transmission stream via a first transmission channel 250, and transmits a second transmission stream via a second transmission channel 260 having a relatively lower transmission capacity than the first transmission channel 250. Also, the transmitter 240 includes a first error correction encoder 241 for performing error correction encoding on the first transmission stream, a second error correction encoder 242 for performing error correction encoding on the second transmission stream, and a modulator 243. In this example, in a case of hierarchical modulation, the first transmission channel 250 and the second transmission channel 260 may correspond to a base layer and an enhancement layer, respectively, and in a case of a hybrid network, the first transmission channel 250 and the second transmission channel 260 may be channels differing from each other. By way of example, in the case of the hybrid network, the first transmission channel 250 may be a broadcasting network, and the second transmission channel 260 may be an Internet protocol (IP) network. Consequently, the first encoding stream 231 and the second encoding stream 232 may be transmitted via the first transmission channel 250 having a relatively higher transmission capacity, and the third encoding stream 233 may be transmitted via the second transmission channel 260 having a relatively lower transmission capacity than the first transmission channel 250.

Figure 3:
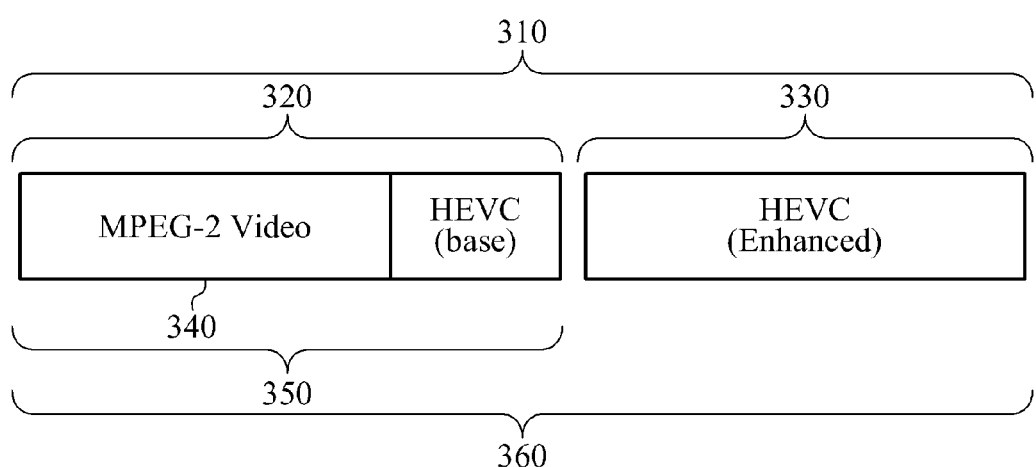
FIG. 3 is a diagram illustrating channel assignment and a program configuration in an advanced television system committee (ATSC)-augmented data transmission (ADT) digital television (DTV) when a first transmission system for transmitting a realistic broadcasting image including a UHD image is used according to an embodiment of the present invention.

FIG. 3 is a diagram illustrating channel assignment and a program configuration in an ATSC-ADT DTV when a first transmission system for transmitting a realistic broadcasting image including a UHD image is used according to an embodiment of the present invention.

Referring to FIG. 3, the ATSC-ADT DTV includes a transmission channel 310 of 6 megahertz (MHz), and the transmission channel 310 includes a basic channel 320 of 19.4 megabits per second (Mbps) and an ADT additional channel 330 of about 8 Mbps.

The ATSC-ADT DTV transmits a UHD TV program 360 via the transmission channel 310. In this example, the basic channel 320 includes an HDTV program 340 compressed in moving picture expert group (MPEG)-2 Video, a semi-UHD TV program 350 compressed in MPEG-2 Video and HEVC (base), and a UHD program 360 compressed by combining HEVC (enhanced) of the ADT additional channel 330 with MPEG-2 Video and HEVC (base) of the basic channel 320.

For example, MPEG-2 Video corresponds to a first image encoder, HEVC (base) corresponds to a second image encoder, and HEVC (enhanced) corresponds to a third image encoder.

Figure 4:
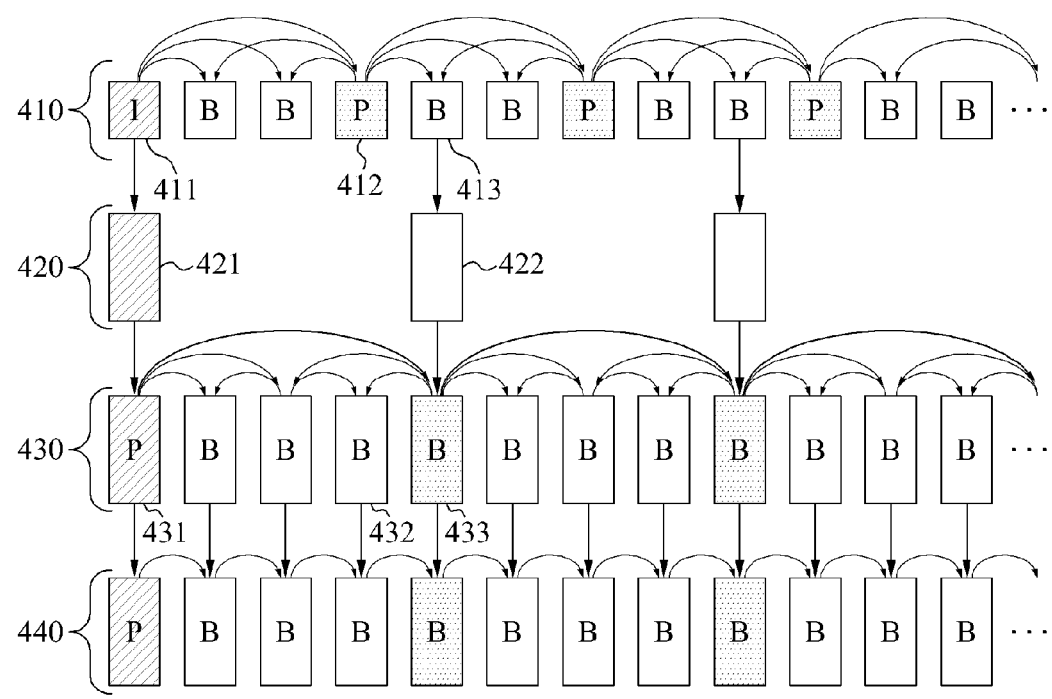
FIG. 4 is a diagram illustrating an operation of an image encoder when a first transmission system for transmitting a realistic broadcasting image including a UHD image is used according to an embodiment of the present invention.

FIG. 4 is a diagram illustrating an operation of an image encoder when a first transmission system for transmitting a realistic broadcasting image including a UHD image is used according to an embodiment of the present invention.

Referring to FIG. 4, a first image encoder 410 of the first transmission system operates separately as an encoder for encoding an existing HD image. For example, the first image encoder 410 corresponds to an MPEG-2 encoder. In this example, an "I" picture 411 is an intra picture, and a "P" picture 412 and a "B" picture 413 are encoded by reference coding.

A second image encoder 430 uses an image 420 up-scaled to a size of a UHD image by being decoded in the first image encoder 410 for reference coding, to enhance encoding efficiency. For example, the second image encoder 430 reference codes focusing on pictures having relatively high bit rates. For a further example, an "I" picture 421 of the up-scaled image 420 by being decoded in the first image encoder 410 is reference coded to a "P" picture 431 in the second image encoder 430, and a "P" picture 431 of the up-scaled image 420 by being decoded in the first image encoder 410 is reference coded to a "B" picture 432 in the second image encoder 430, and a "B" picture 422 of the up-scaled image 420 by being decoded in the first image encoder 410 is reference coded to a "B" picture 433 in the second image encoder 430.

A third image encoder 440 uses a decoded image of the second image encoder 430 for reference coding. For example, the third image encoder 440 may operate in a similar manner to quality scalability mode of a scalable video encoder.

Figure 5:
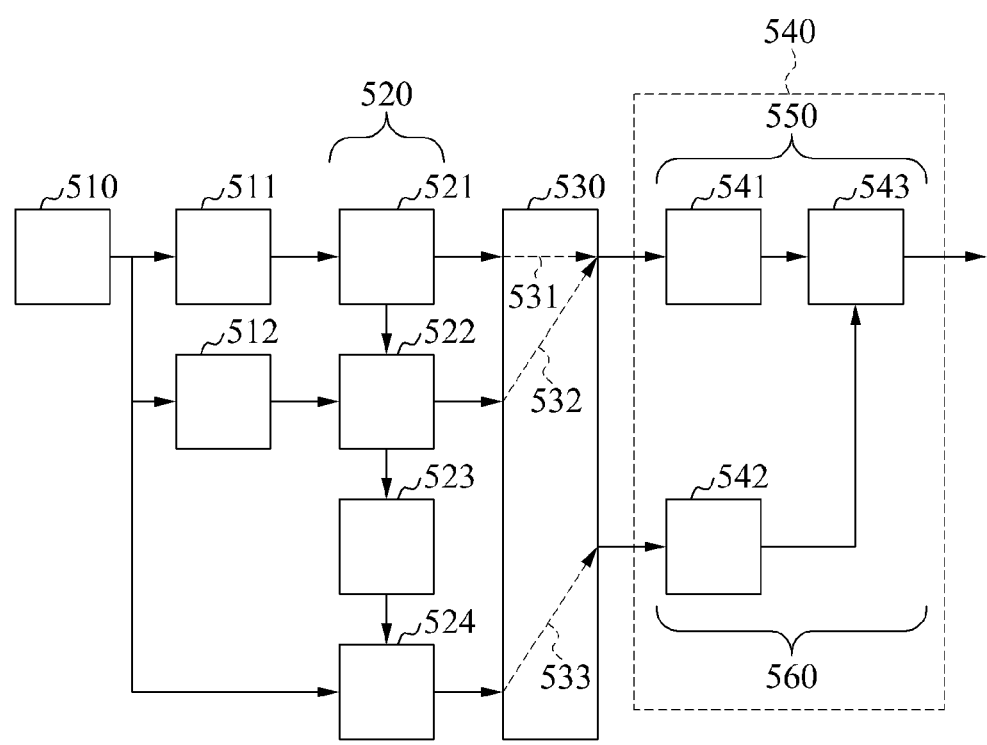
FIG. 5 is a diagram illustrating a second transmission system for transmitting a realistic broadcasting image including a UHD image according to an embodiment of the present invention.

FIG. 5 is a diagram illustrating a second transmission system for transmitting a realistic broadcasting image including a UHD image according to an embodiment of the present invention.

Referring to FIG. 5, a first transmission system includes a plurality of image encoders 520 for generating a plurality of encoding streams from a UHD image 510, a multiplexer 530 for generating a plurality of transmission streams by applying at least one of packetization, synchronization, and multiplexing to the plurality of encoding streams, and a transmitter 540 for appropriately distributing and transmitting the plurality of transmission streams via differing channels. In this example, the plurality of image encoders 520 includes a first image encoder 521, a second image encoder 522, and a third image encoder 524. In particular, the first image encoder 521 generates, from an HD image, a first encoding stream 531 by including a down-scaler 511, 512 for reducing a resolution of the UHD image 510, converting a scanning method as necessary, and obtaining the HD image. Here, the converting of the scanning method refers to converting a progressive scanning method into an interlaced scanning method. Also, the second image encoder 522 generates a second encoding stream 532 by encoding the HD image obtained from the down-scaler 511, decoding an image corresponding to the first encoding stream 531, and reference encoding the decoded image and the obtained HD image. Further, a third image encoder 524 generates a third encoding stream 533 through reference encoding a restored UHD image differing from the UHD image 510 and the UHD image 510, by including an up-scaler 523 for decoding an image corresponding to the second encoding stream 532, expanding a resolution of the decoded image, converting a scanning method as necessary, and obtaining the restored UHD image differing from the UHD image 510.

In particular, the first encoding stream 531 may correspond to an HD image, the first encoding stream 531 and the second encoding stream 532 may correspond to an HD image of which a picture quality is enhanced, and the first encoding stream 531, the second encoding stream 532, and the third encoding stream 533 may correspond to a UHD image.

The multiplexer 530 generates a first transmission stream by applying at least one of packetization, synchronization, and multiplexing to the first encoding stream 531 and the second encoding stream 532, and generates a second transmission stream by applying at least one of packetization and synchronization to the third encoding stream 533.

The transmitter 540 transmits the first transmission stream via a first transmission channel 550, and transmits the second transmission stream via a second transmission channel 560 having a relatively lower transmission capacity than the first transmission channel 550. Also, the transmitter 540 includes a first error correction encoder 541 for performing error correction encoding on the first transmission stream, a second error correction encoder 542 for performing error correction encoding on the second transmission stream, and a modulator 543. In this example, in a case of hierarchical modulation, the first transmission channel 550 and the second transmission channel 560 may correspond to a base layer and an enhancement layer, respectively, and in a case of a hybrid network, the first transmission channel 550 and the second transmission channel 560 may be channels differing from each other. By way of example, in the case of the hybrid network, the first transmission channel 550 may be a broadcasting network, and the second transmission channel 560 may be an IP network. Consequently, the first encoding stream 531 and the second encoding stream 532 may be transmitted via the first transmission channel 550 having a relatively higher transmission capacity, and the third encoding stream 533 may be transmitted via the second transmission channel 560 having a relatively lower transmission capacity than the first transmission channel 550.

Figure 6:
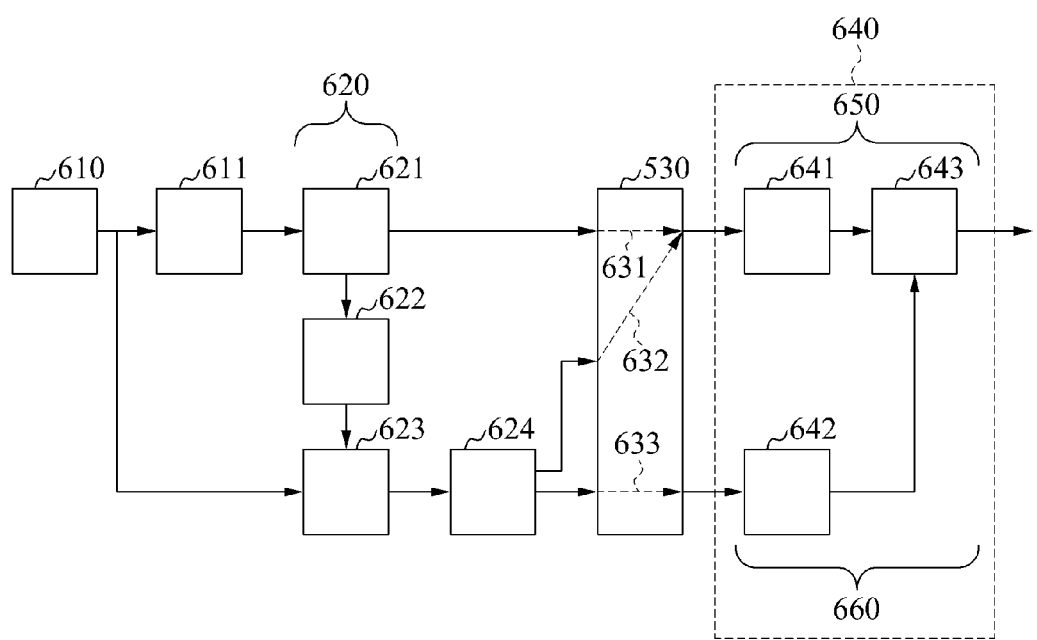
FIG. 6 is a diagram illustrating a third transmission system for transmitting a realistic broadcasting image including a UHD image according to an embodiment of the present invention.

FIG. 6 is a diagram illustrating a third transmission system for transmitting a realistic broadcasting image including a UHD image according to an embodiment of the present invention.

Referring to FIG. 6, the third transmission system includes a plurality of image encoders 620 for generating a plurality of encoding streams from a UHD image 610, a multiplexer 630 for generating a plurality of transmission streams by applying at least one of packetization, synchronization, and multiplexing to the plurality of encoding streams, a stream separator 624, and a transmitter 640 for appropriate distribution and transmission of the plurality of transmission streams via differing channels. In this example, the plurality of image encoders 620 includes a first image encoder 621 and a second image encoder 623. In particular, the first image encoder 621 generates, from an HD image, a first encoding stream 631 by including a down-scaler 611 for reducing a resolution of the UHD image 610, converting a scanning method as necessary, and obtaining the HD image. The second image encoder 623 generates a second encoding stream 632 through reference encoding a restored UHD image differing from the UHD image 510 and the UHD image 610, by including an up-scaler 622 for decoding an image corresponding to the first encoding stream 631, expanding a resolution of the decoded image, converting a scanning method as necessary, and obtaining the restored UHD image differing from the UHD image 610.

Also, the stream separator 624 generates a third encoding stream and a fourth encoding stream 633 by separating the second encoding stream 632. In this example, the separating method may use at least one of a tile unit, a network abstraction layer (NAL) unit, a PES packet, and a TS unit supported by HEVC.

In particular, the first encoding stream 631 may correspond to an HD image, or the first encoding stream 631 and the second encoding stream 632 may correspond to a UHD image.

The multiplexer 630 generates a first transmission stream by applying at least one of packetization, synchronization, and multiplexing to the first encoding stream 631 and a third encoding stream 633, and generates a second transmission stream by applying at least one of packetization and synchronization to the fourth encoding stream 633.

The transmitter 640 transmits the first transmission stream via a first transmission channel 650, and transmits the second transmission stream via a second transmission channel 660 having a relatively lower transmission capacity than the first transmission channel 650. Also, the transmitter 640 includes a first error correction encoder 641 for performing error correction encoding on the first transmission stream, a second error correction encoder 642 for performing error correction encoding on the second transmission stream, and a modulator 643. In this example, in a case of hierarchical modulation, the first transmission channel 650 and the second transmission channel 660 may correspond to a base layer and an enhancement layer, respectively, and in a case of a hybrid network, the first transmission channel 650 and the second transmission channel 660 may be channels differing from each other. By way of example, in the case of the hybrid network, the first transmission channel 650 may be a broadcasting network, and the second transmission channel 660 may be an IP network. Consequently, the first encoding stream 631 and the third encoding stream 633 may be transmitted via the first transmission channel 650 having a relatively higher transmission capacity, and the fourth encoding stream 633 may be transmitted via the second transmission channel 660 having a relatively lower transmission capacity than the first transmission channel 650.

Figure 7:
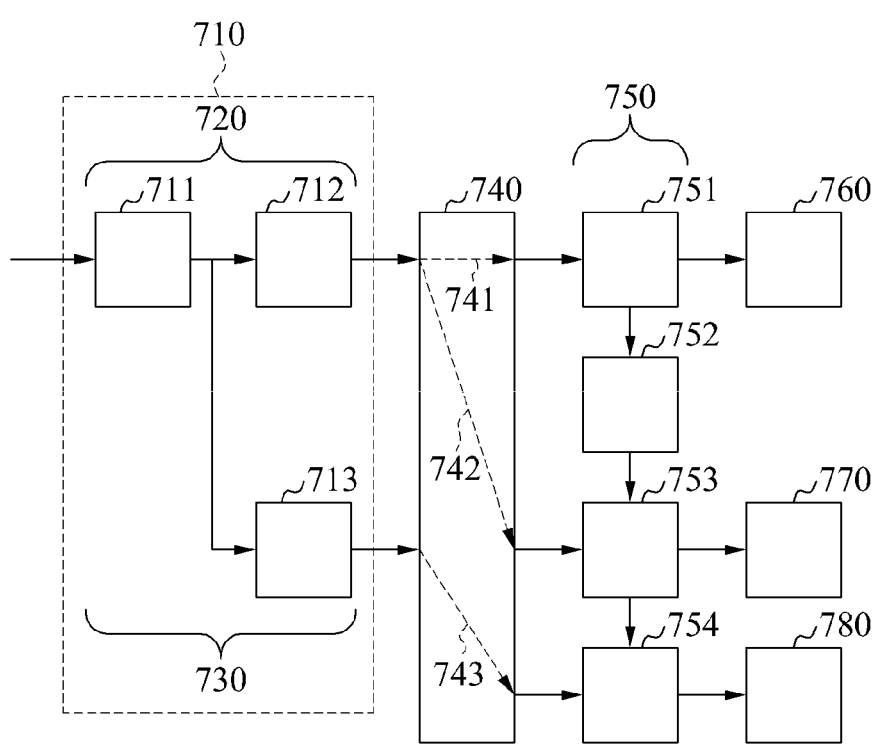
FIG. 7 is a diagram illustrating a first reception system for receiving a realistic broadcasting image including a UHD image according to an embodiment of the present invention.

FIG. 7 is a diagram illustrating a first reception system for receiving a realistic broadcasting image including a UHD image according to an embodiment of the present invention.

Referring to FIG. 7, the first reception system includes a receiver 710 for receiving a plurality of transmission streams via differing channels, a demultiplexer 740 for generating a plurality of encoding streams corresponding to the plurality of transmission streams, and a plurality of image decoders 750 for generating a plurality of images corresponding to the plurality of encoding streams.

The receiver 710 receives a first transmission stream via a first transmission channel 720, and receives a second transmission stream via a second transmission channel 730 having a relatively lower transmission capacity than the first transmission channel 720. Also, the receiver 710 includes a demodulator 711 for channel decoding a received signal, a first error correction decoder 712 for performing error correction decoding on the first transmission stream, and a second error correction decoder 713 for performing error correction decoding on the second transmission stream.

The demultiplexer 740 obtains a first encoding stream 741 and a second encoding stream 742 by separating the first transmission stream, and obtains a third encoding stream 743 from the second transmission stream.

Also, the plurality of image decoders 750 includes a first image decoder 751, a second image decoder 753, and a third image decoder 754. In particular, the first image decoder 751 generates an HD image 760 from the first encoding stream 741. The second image decoder 753 generates a semi-HD image 770 through reference decoding a UHD image and the second encoding stream 742, by including an up-scaler 752 for decoding an image corresponding to the first encoding stream 741, expanding a resolution of the decoded image, converting a scanning method as necessary, and obtaining the UHD image. Further, the third image decoder 754 generates a UHD image 780 by reference decoding the semi-HD image 770 and a third encoding stream. In this example, when the first reception system is an ATSC-DTV, the first image encoder 751 and the first error correction decoder 712 may correspond to an MPEG-2 Video decoder and a trellis-coded-modulation (TCM) decoder, and the second image decoder 753, the third image decoder 754, and the second error correction decoder 713 may correspond to an MPEG-4 advanced video coding (AVC) decoder, an HEVC image decoder, and a low-density parity-check (LDPC) decoder.

Figure 8:
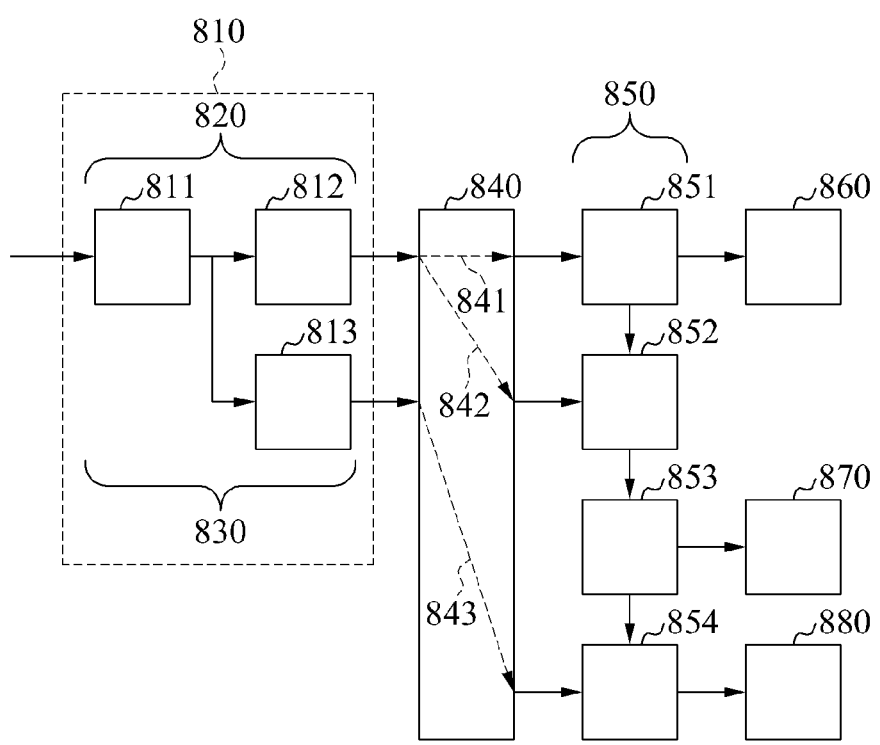
FIG. 8 is a diagram illustrating a second reception system for receiving a realistic broadcasting image including a UHD image according to an embodiment of the present invention.

FIG. 8 is a diagram illustrating a second reception system for receiving a realistic broadcasting image including a UHD image according to an embodiment of the present invention.

Referring to FIG. 8, the second reception system includes a receiver 810 for receiving a plurality of transmission streams via differing channels, a demultiplexer 840 for generating a plurality of encoding streams corresponding to the plurality of transmission streams, and a plurality of image decoders 850 for generating a plurality of images corresponding to the plurality of encoding streams.

The receiver 810 receives a first transmission stream via a first transmission channel 820, and receives a second transmission stream via a second transmission channel 830 having a relatively lower transmission capacity than the first transmission channel 820. Also, the receiver 810 includes a demodulator 811 for channel decoding a received signal, a first error correction decoder 812 for performing error correction decoding on the first transmission stream, and a second error correction decoder 813 for performing error correction decoding on the second transmission stream.

The demultiplexer 840 generates a first encoding stream 841 and a second encoding stream 842 by separating the first transmission stream, and generates a third encoding stream 843 from the second transmission stream.

Also, the plurality of image decoders 850 includes a first image decoder 851, a second image decoder 852, and a third image decoder 854. In particular, the first image decoder 851 generates an HD image 860 from the first encoding stream 841. The second image decoder 853 generates an HD image 870 of which a picture quality is enhanced by decoding an image corresponding to the first encoding stream 841, and reference decoding the decoded image and the second encoding stream 842. Further, the third image decoder 854 generates a UHD image 880 through reference decoding a UHD image and the third encoding stream 843, by including an up-scaler 853 for decoding an image corresponding to the second encoding stream, expanding a resolution of the decoded image, converting a scanning method as necessary, and obtaining the UHD image.

Figure 9:
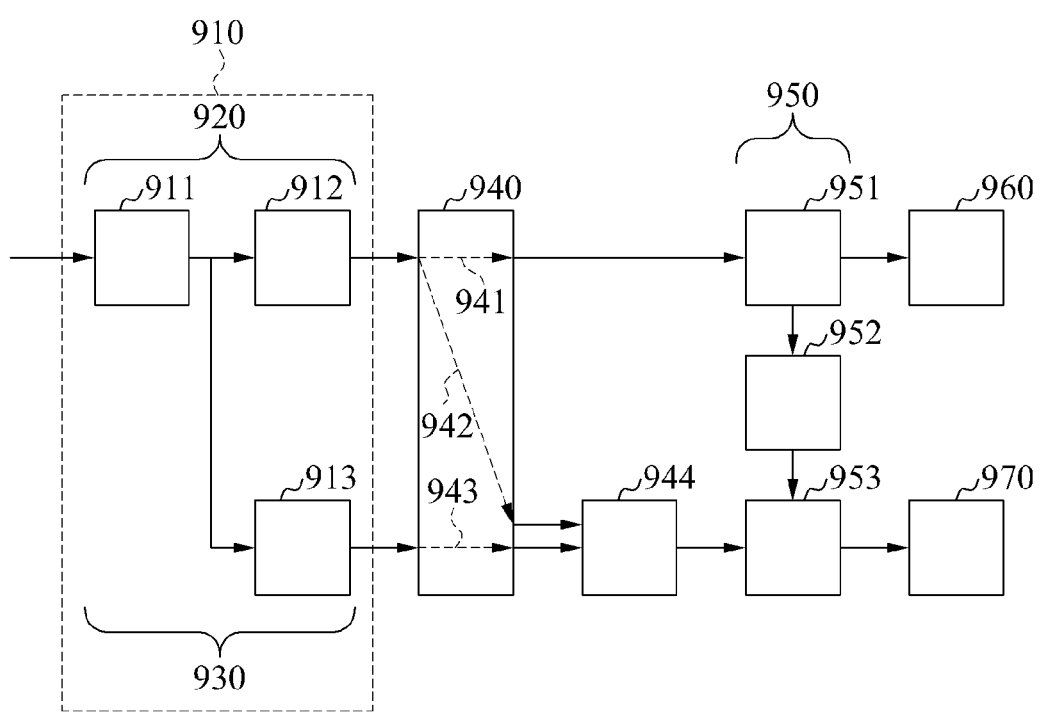
FIG. 9 is a diagram illustrating a third reception system for receiving a realistic broadcasting image including a UHD image according to an embodiment of the present invention.

FIG. 9 is a diagram illustrating a third reception system for receiving a realistic broadcasting image including a UHD image according to an embodiment of the present invention.

Referring to FIG. 9, the third reception system includes a receiver 910 for receiving a plurality of transmission streams via differing channels, a demultiplexer 940 for generating a plurality of encoding streams corresponding to the plurality of transmission streams, a stream combiner 944, and a plurality of image decoders 950 for generating a plurality of images corresponding to the plurality of encoding streams.

The receiver 910 receives a first transmission stream via a first transmission channel 920, and receives a second transmission stream via a second transmission channel 930 having a relatively lower transmission capacity than the first transmission channel 920. Also, the receiver 910 includes a demodulator 911 for channel decoding a received signal, a first error correction decoder 912 for performing error correction decoding on the first transmission stream, and a second error correction decoder 913 for performing error correction decoding on the second transmission stream.

The demultiplexer 940 obtains a first encoding stream 941 and a third encoding stream 942 by separating the first transmission stream, and obtains a fourth encoding stream 943 from the second transmission stream.

Also, the stream combiner 944 generates a second encoding stream by combining the third encoding stream 942 and the fourth encoding stream 943.

Further, the plurality of image decoders 950 includes a first image decoder 951 and a second image decoder 952. In particular, the first image decoder 951 generates an HD image 960 from the first encoding stream 941. The second image decoder 952 generates a UHD image 970 having a great image quality through reference decoding a UHD image and the second encoding stream, by including an up-scaler 952 for decoding an image corresponding to the first encoding stream 941, expanding a resolution of the decoded image, and converting a scanning method as necessary.

Figure 10:
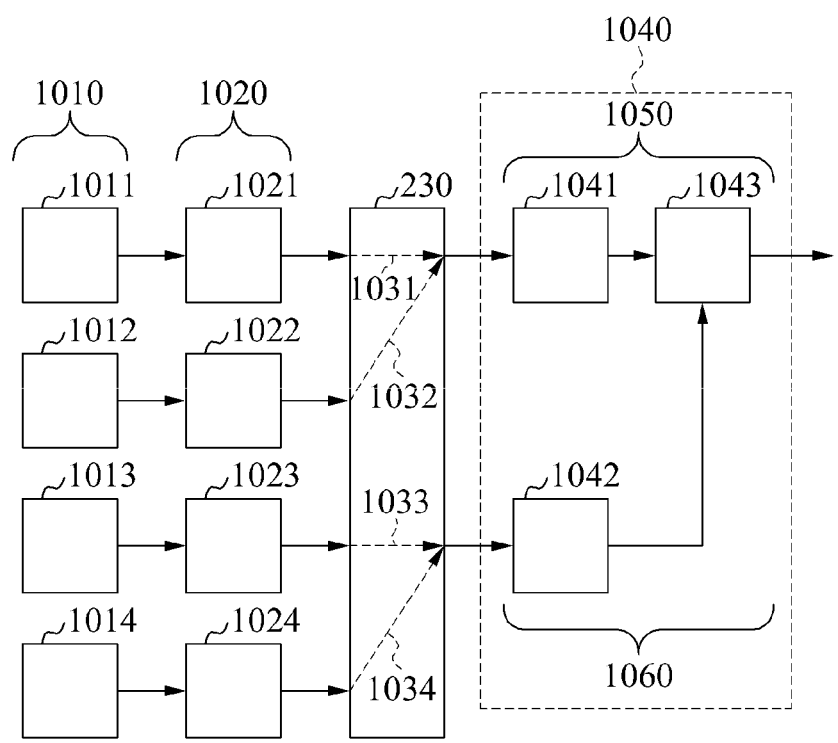
FIG. 10 is a diagram illustrating a transmission system for transmitting a realistic broadcasting image including a three-dimensional (3D) image and a panorama image according to an embodiment of the present invention.

FIG. 10 is a diagram illustrating a transmission system for transmitting a realistic broadcasting image including a 3D image and a panorama image according to an embodiment of the present invention.

Referring to FIG. 10, the transmission system includes a plurality of encoders 1020 for obtaining a plurality of encoding streams from a plurality of images 1010 configuring a 3D image and a panorama image, a multiplexer 1030 for generating a plurality of transmission streams by applying at least one of packetization, synchronization, and multiplexing to each of the plurality of encoding streams, and a transmitter 1040 for appropriately distributing and transmitting the plurality of transmission streams by via differing channels. In this example, when the plurality of images 1010 corresponds to the panorama image, the plurality of images 1010 may be a plurality of panorama images divided into predetermined sizes, and when the plurality of images 1010 corresponds to the 3D image, may be a left image, a right image, and a depth image.

The plurality of image encoders 1020 includes a first image encoder 1021, a second image encoder 1022, a third image encoder 1023, and a fourth image encoder 1024. In particular, the first image encoder 1021 generates a first encoding stream from a first image 1011, and the second encoder 1022 generates a second encoding stream from a second image 1012. The third image encoder 1023 generates a third encoding stream by decoding and restoring an image corresponding to the second encoding stream, and reference encoding the restored image and a third image 1013. In this example, reference coding may be selectively applied when an input is a 3D image. Also, the fourth image encoder 1024 generates a fourth encoding stream from a fourth image 1014.

The multiplexer 1030 generates a first transmission stream by applying at least one of packetization, synchronization, and multiplexing to first encoding stream groups 1031 and 1032 extracted based on predetermined conditions. Also, the multiplexer 1030 generates a second transmission stream by applying at least one of packetization and synchronization to second encoding stream groups 1033 and 1034 extracted to differ from the first encoding stream groups 1031 and 1032.

The transmitter 1040 transmits the first transmission stream via a first transmission channel 1050, and transmits a second transmission stream via a second transmission channel 1060 having a relatively lower transmission capacity than the first transmission channel 1050. Also, the transmitter 1040 includes a first error correction encoder 1041 for performing error correction encoding on the first transmission stream, a second error correction encoder 1042 for performing error correction encoding on the second transmission stream, and a modulator 1043. In this example, in a case of hierarchical modulation, the first transmission channel 1050 and the second transmission channel 1060 may correspond to a base layer and an enhancement layer, respectively, and in a case of a hybrid network, the first transmission channel 1050 may be a broadcasting network, and the second transmission channel 1060 may be an IP network. Consequently, the first encoding stream groups 1031 and 1032 may be transmitted via the first transmission channel 1050 having a relatively higher transmission capacity, and the second encoding stream groups 1033 and 1034 may be transmitted via the second transmission channel 1060 having a relatively lower transmission capacity than the first transmission channel 1050.

Figure 11:
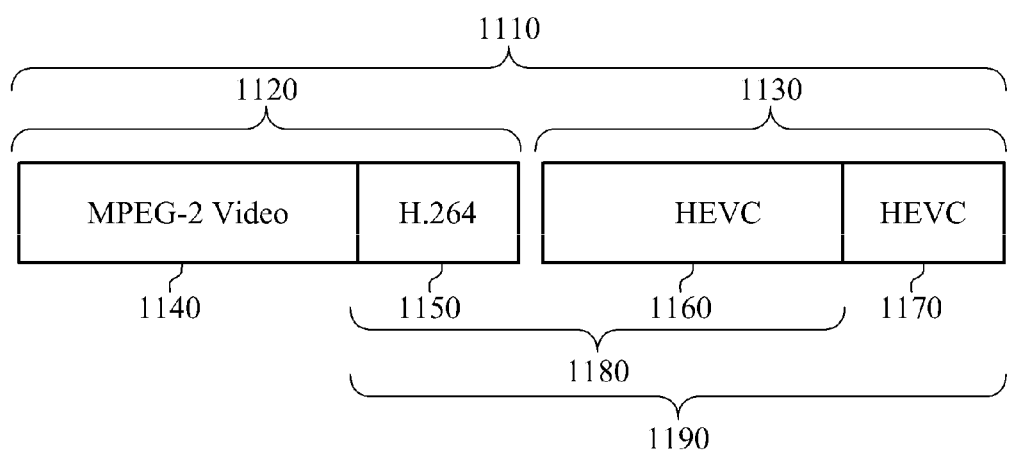
FIG. 11 is a diagram illustrating channel assignment and a program configuration in an ATSC-ADT DTV when a transmission system for transmitting a realistic broadcasting image including a 3D image is used according to an embodiment of the present invention.

FIG. 11 is a diagram illustrating channel assignment and a program configuration in an ATSC-ADT DTV when a transmission system for transmitting a realistic broadcasting image including a 3D image is used according to an embodiment of the present invention.

Referring to FIG. 11, the ATSC-ADT DTV includes a transmission channel 1110 of 6 MHz, and the transmission channel 1110 includes a basic channel 1120 of 19.4 Mbps and an ADT additional channel 1130 of 8 Mbps.

The ATSC-ADT DTV transmits a 3D program via the transmission channel 1110. In this example, the 3D program includes a first HDTV program 1140 and a multiple view 3D program 1190 compressed in MPEG-2 Video of 12 Mbps, and the multiple view 3D program 1190 includes a stereoscopic 3D program 1180, from which a depth image is excluded, compressed in HEVC 1170. Also, the stereoscopic 3D program 1180 includes a left image compressed in H.264 1150 of 6 Mbps and a right image compressed in HEVC 1160.

Figure 12:
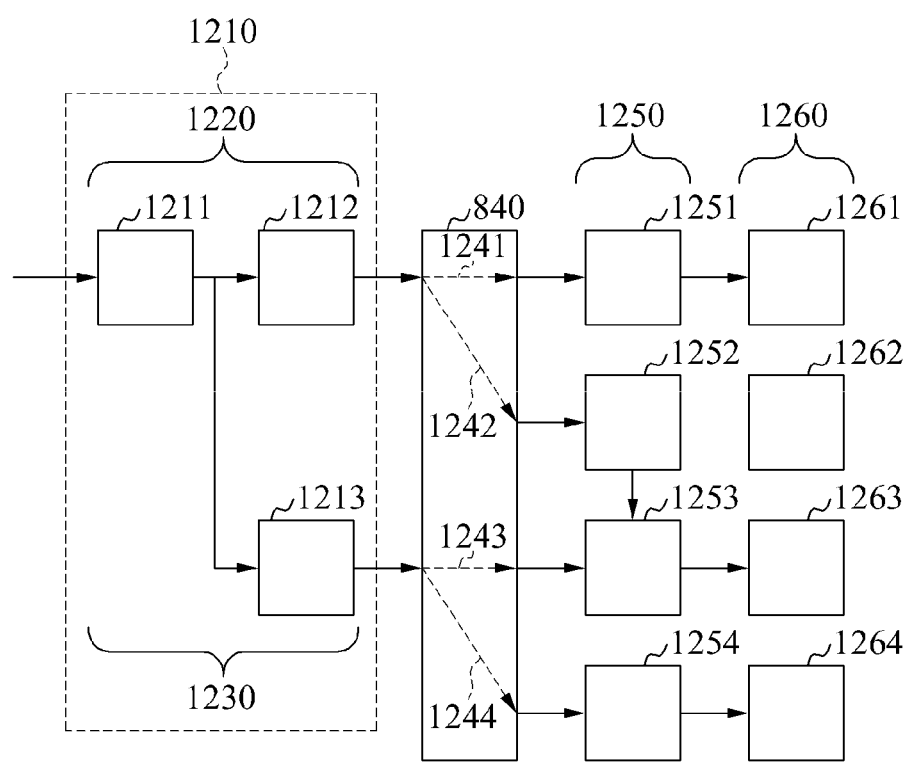
FIG. 12 is a diagram illustrating a reception system for receiving a realistic broadcasting image including a 3D image and a panorama image according to an embodiment of the present invention.

FIG. 12 is a diagram illustrating a reception system for receiving a realistic broadcasting image including a 3D image and a panorama image according to an embodiment of the present invention.

Referring to FIG. 12, the reception system includes a receiver 1210 for receiving a plurality of transmission streams via differing channels, a demultiplexer 1240 for generating a plurality of encoding streams corresponding to the plurality of transmission streams, and a plurality of image decoders 1250 for generating a plurality of images corresponding to the plurality of encoding streams.

The receiver 1210 receives a first transmission stream via a first transmission channel 1220, and receives a second transmission stream via a second transmission channel 1230 having a relatively lower transmission capacity than the first transmission channel 1220. Also, the receiver 1210 includes a demodulator 1211 for channel decoding a received signal, a first error correction decoder 1212 for performing error correction decoding on the first transmission stream, and a second error correction decoder 1213 for performing error correction decoding on the second transmission stream.

The demultiplexer 1240 obtains a first encoding stream 1241 and a second encoding stream 1242 by separating the first transmission stream, obtains a third encoding stream 1243 and a fourth encoding stream 1244 from the second transmission stream.

Also, the plurality of image decoders 1250 includes a first image decoder 1251, a second image decoder 1252, a third image decoder 1253, and a fourth image decoder 754. In particular, the first image decoder 1251, the second image decoder 1252, the third image decoder 1253, and the fourth image decoder 1254 generate images 1261, 1262, 1263, and 1264 corresponding to the decoders, respectively.

In addition, the plurality of images 1260 obtained from the plurality of image decoders 1250 is combined and generated in a form of at least one of a 3D image and a panorama image.

Figure 13:
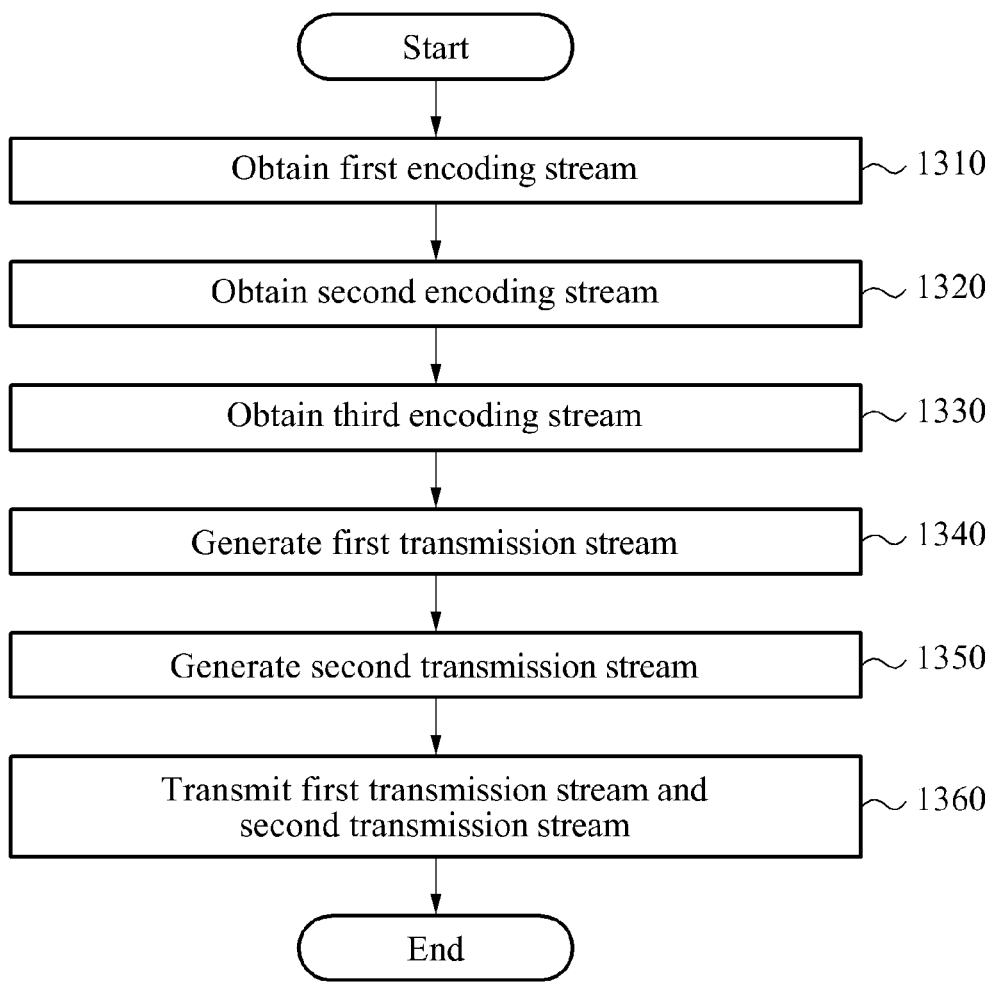
FIG. 13 is a flowchart illustrating a first transmission method of transmitting a realistic broadcasting image including a UHD image according to an embodiment of the present invention.

FIG. 13 is a flowchart illustrating a first transmission method of transmitting a realistic broadcasting image including a UHD image according to an embodiment of the present invention.

Referring to FIG. 13, in operation 1310, a method according to the present exemplary embodiment includes generating a first encoding stream from an HD image. The generating of the first encoding stream includes reducing a resolution of a UHD image, obtaining an HD image, and encoding the HD image.

Also, in operation 1320, the method according to the present exemplary embodiment includes generating a second encoding stream from at least one of the UHD image and an image restored from the first encoding stream. In this example, the generating of the second encoding stream includes decoding an image corresponding to the first encoding stream, generating a decoded image, expanding a resolution of the decoded image, converting a scanning method as necessary, obtaining a restored UHD image, and reference encoding the restored UHD image and the UHD image based on an inter-picture prediction method.

Further, in operation 1330, the method according to the present exemplary embodiment includes generating a third encoding stream from at least one of the UHD image and an image restored from the second encoding stream. In this example, the generating of the third encoding stream includes decoding an image corresponding to the second encoding stream, generating a decoded image, and reference encoding the decoded image and the UHD image.

In operation 1340, the method according to the present exemplary embodiment includes generating a first transmission stream by applying at least one of packetization, synchronization, and multiplexing to the first encoding stream and the second encoding stream.

In operation 1350, the method according to the present exemplary embodiment includes generating a second transmission stream by applying at least one of packetization and synchronization to the third encoding stream.

The method according to the present exemplary embodiment includes performing error correction encoding on the first transmission stream and the second transmission stream.

In operation 1360, the method according to the present exemplary embodiment includes transmitting the first transmission stream via a first transmission channel, and transmitting the second transmission stream via a second transmission channel having a relatively lower transmission capacity than the first transmission channel.

Figure 14:
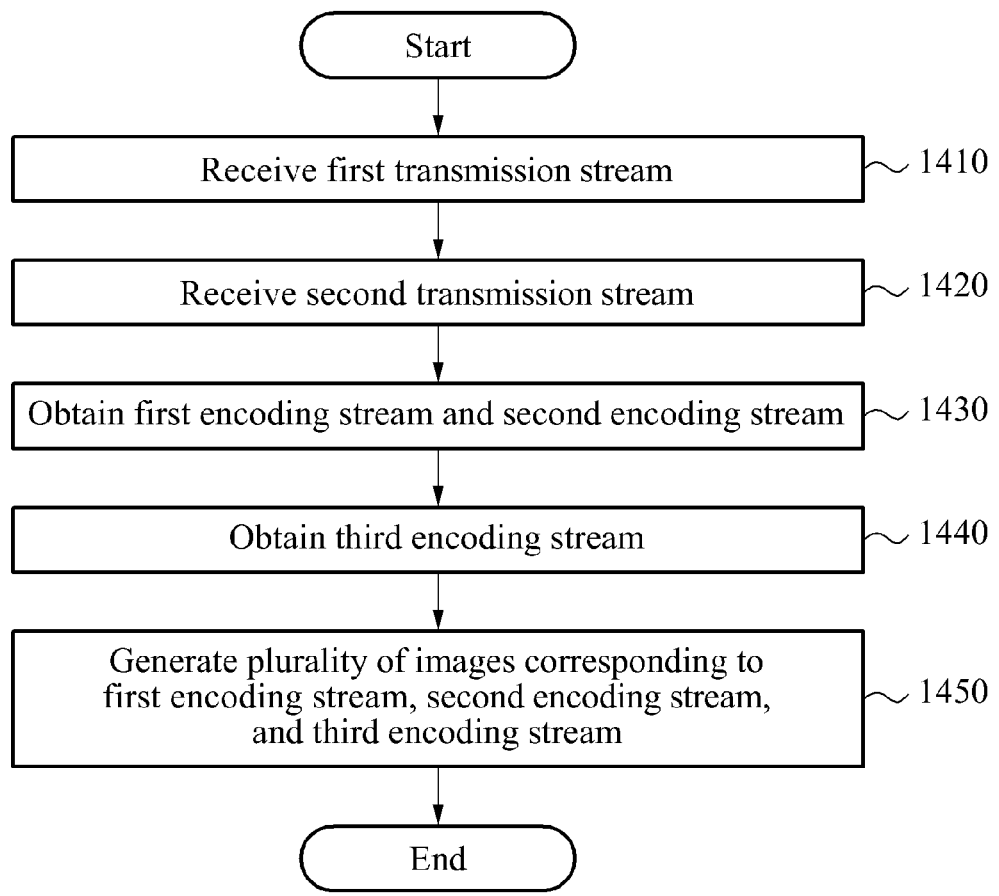
FIG. 14 is a flowchart illustrating a first reception method of receiving a realistic broadcasting image including a UHD image according to an embodiment of the present invention.

FIG. 14 is a flowchart illustrating a first reception method of receiving a realistic broadcasting image including a UHD image according to an embodiment of the present invention.

Referring to FIG. 14, in operation 1410, the method according to the present exemplary embodiment includes receiving a first transmission stream via a first transmission channel. In this example, the receiving of the first transmission stream includes generating the first transmission stream by channel decoding a signal received via the first transmission channel.

Also, in operation 1420, the method according to the present exemplary embodiment includes receiving a second transmission stream via a second transmission channel. In this example, the receiving of the second transmission stream includes generating the second transmission stream by channel decoding a signal received via the second transmission channel.

In operation 1430, the method according to the present exemplary embodiment includes generating a first encoding stream and a second encoding stream by separating the first transmission stream.

In operation 1440, the method according to the present exemplary embodiment includes generating a third encoding stream from the second transmission stream.

In operation 1450, the method according to the present exemplary embodiment includes generating an HD image from the first encoding stream, generating a semi-UHD image from the first encoding stream and the second encoding stream, and generating a UHD image from the first encoding stream, the second encoding stream, and the third encoding stream.

Figure 15:
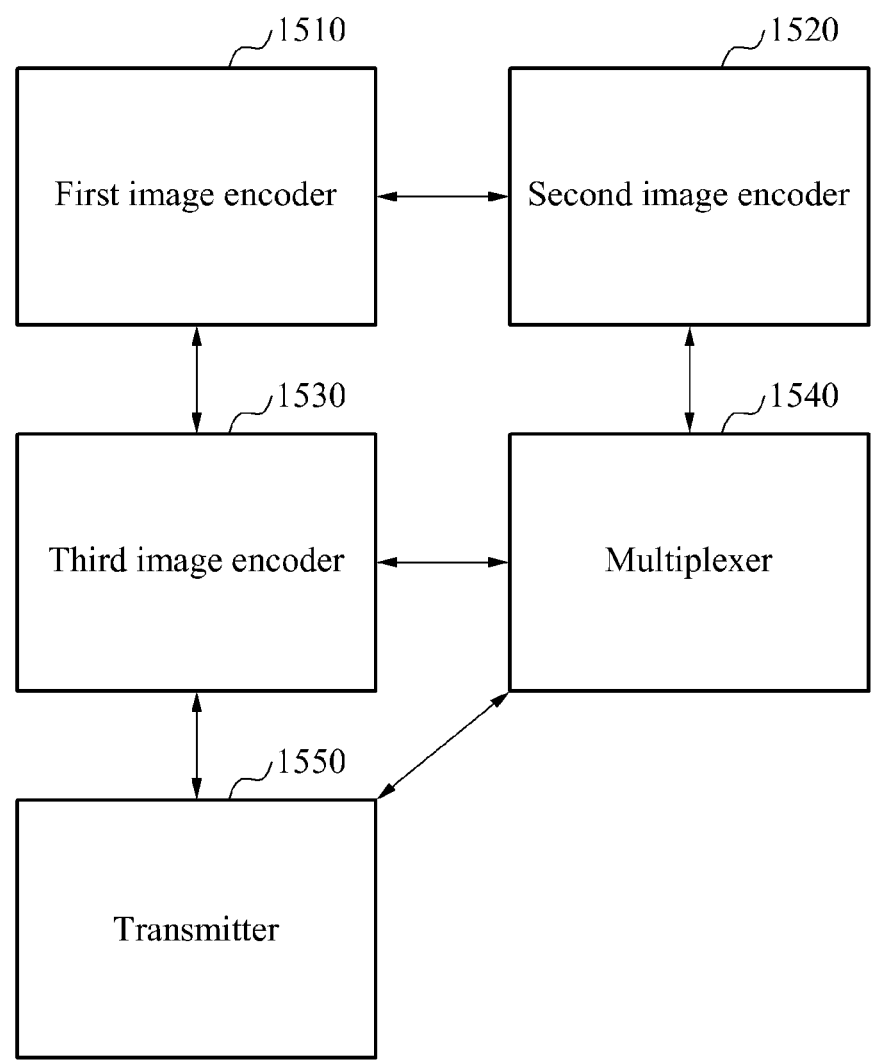
FIG. 15 is a block diagram illustrating a first transmission system for transmitting a realistic broadcasting image including a UHD image according to an embodiment of the present invention.

FIG. 15 is a block diagram illustrating a first transmission system for transmitting a realistic broadcasting image including a UHD image according to an embodiment of the present invention.

Referring to FIG. 15, the first transmission system includes a first image encoder 1510, a second image encoder 1520, a third image encoder 1530, a multiplexer 1540, and a transmitter 1550.

The first image encoder 1510 generates a first encoding stream from an HD image.

The second image encoder 1520 generates a second encoding stream from at least one of a UHD image and an image restored from the first encoding stream.

The third image encoder 1530 generates a third encoding stream from at least one of a UHD image and an image restored from the second encoding stream.

The multiplexer 1540 generates a first transmission stream by applying at least one of packetization, synchronization, and multiplexing to the first encoding stream and the second encoding stream, and generates a second transmission stream by applying at least one of packetization and synchronization to the third encoding stream.

The transmitter 1550 transmits the first transmission stream via a first transmission channel, and transmits the second transmission stream via a second transmission channel having a relatively lower transmission capacity than the first transmission channel.

Figure 16:
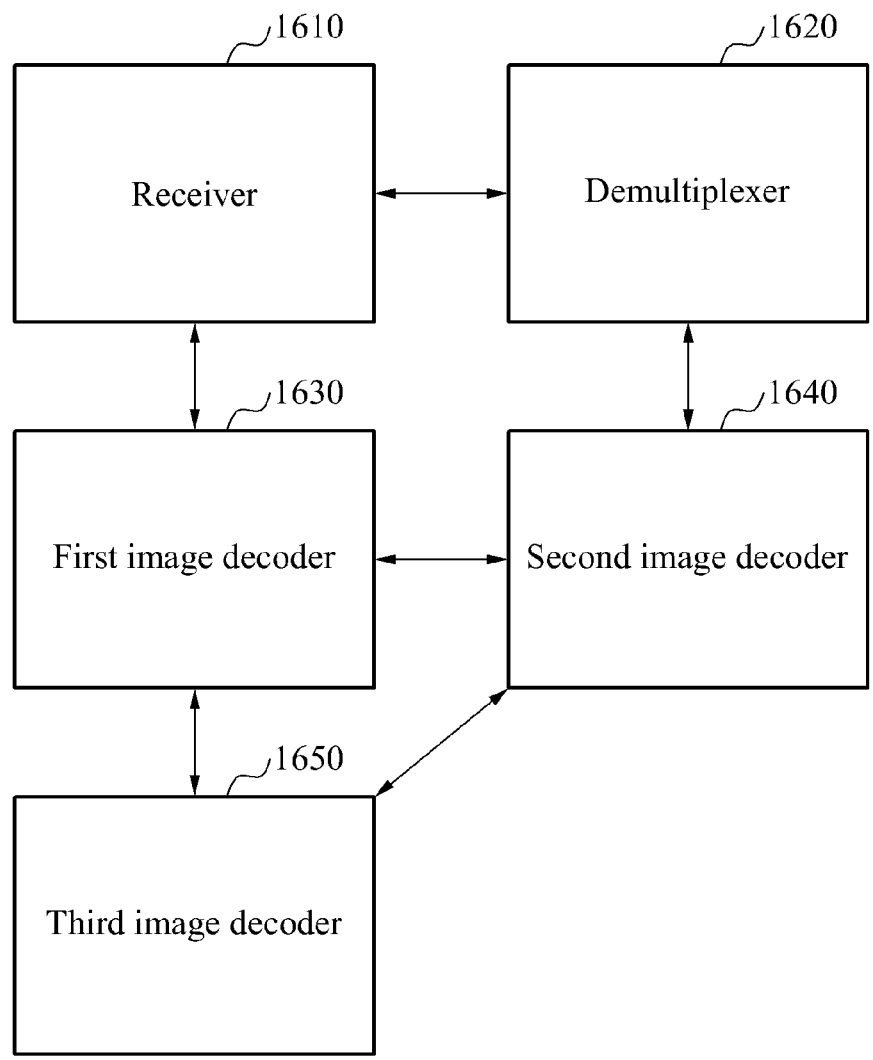
FIG. 16 is a block diagram illustrating a first reception system for receiving a realistic broadcasting image including a UHD image according to an embodiment of the present invention.

FIG. 16 is a block diagram illustrating a first reception system for receiving a realistic broadcasting image including a UHD image according to an embodiment of the present invention.

Referring to FIG. 16, the first reception system includes a receiver 1610, a demultiplexer 1620, a first image decoder 1630, a second image decoder 1640, and a third image decoder 1650.

The receiver 1610 receives a first transmission stream via a first transmission channel, and receives a second transmission stream via a second transmission channel.

The demultiplexer 1620 generates a first encoding stream and a second encoding stream by separating the first transmission stream, and generates a third encoding stream from the second transmission stream.

The first image decoder 1630 generates an HD image corresponding to the first encoding stream from the first encoding stream.

The second image decoder 1640 generates a semi-UHD image from the first encoding stream and the second encoding stream.

The third image decoder 1650 generates a UHD image from the first encoding stream, the second encoding stream, and the third encoding stream.

Figure 17:
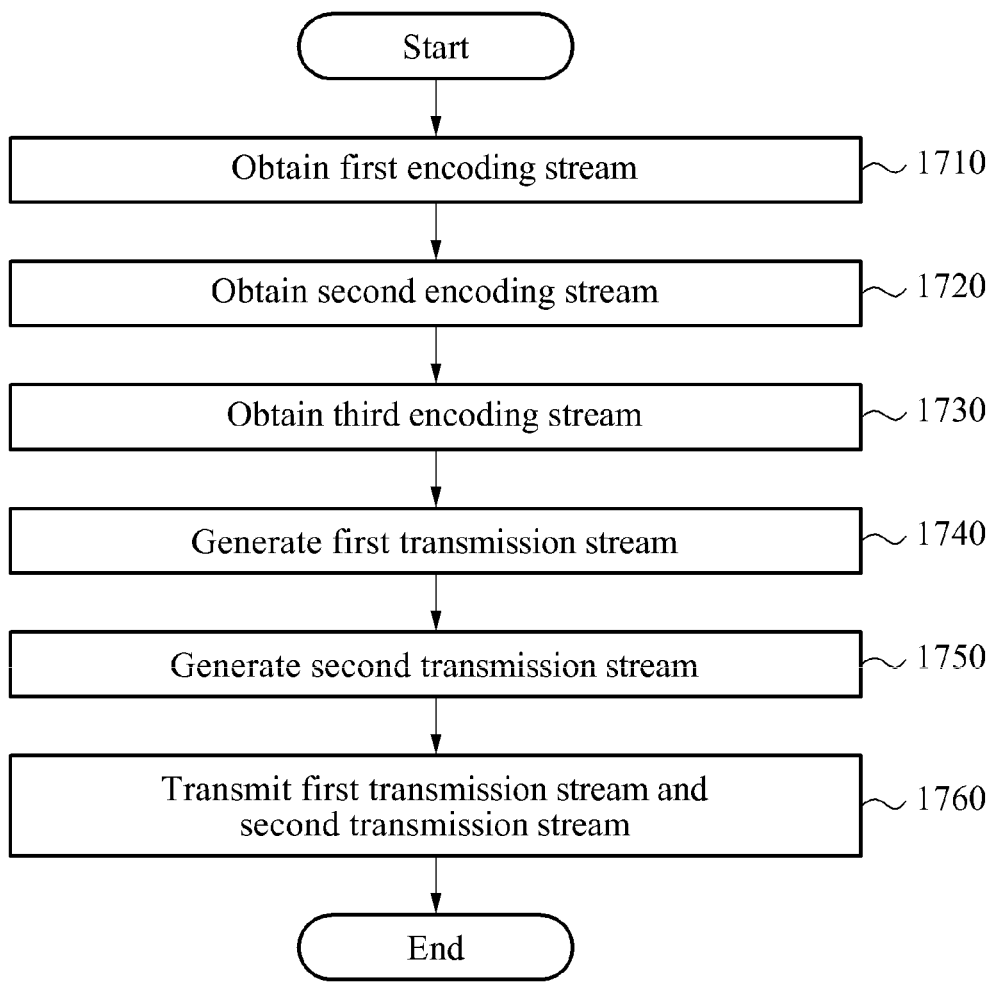
FIG. 17 is a flowchart illustrating a second transmission method of transmitting a realistic broadcasting image including a UHD image according to an embodiment of the present invention.

FIG. 17 is a flowchart illustrating a second transmission method of transmitting a realistic broadcasting image including a UHD image according to an embodiment of the present invention.

Referring to FIG. 17, in operation 1710, a method according to the present exemplary embodiment includes generating a first encoding stream from an HD image. In this example, the generating of the first encoding stream includes reducing a resolution of a UHD image, obtaining an HD image, and encoding the HD image.

Also, in operation 1720, the method according to the present exemplary embodiment includes generating a second encoding stream from at least one of the UHD image and an image restored from the first encoding stream. In this example, the generating of the second encoding stream includes reducing a resolution of the UHD image, obtaining an HD image, decoding an image corresponding to the first encoding stream, generating a decoded image, and reference encoding the decoded image and the HD image.

Further, in operation 1730, the method according to the present exemplary embodiment includes generating a third encoding stream from a UHD image. In this example, the generating of the third encoding stream includes decoding an image corresponding to the second encoding stream, generating a decoded stream, expanding a resolution of the decoded image, converting a scanning method as necessary, obtaining a restored UHD image differing from the UHD image, and reference encoding the restored UHD image and the UHD image.

In operation 1740, the method according to the present exemplary embodiment includes generating a first transmission stream by applying at least one of packetization, synchronization, and multiplexing to the first encoding stream and the second encoding stream.

In operation 1750, the method according to the present exemplary embodiment includes generating a second transmission stream by applying at least one of packetization and synchronization to the third encoding stream.

The method according to the present exemplary embodiment includes performing error correction encoding on the first transmission stream and the second transmission stream.

In operation 1760, the method according to the present exemplary embodiment includes transmitting the first transmission stream via a first transmission channel, and transmitting the second transmission stream via a second transmission channel having a relatively lower transmission capacity than the first transmission channel.

Figure 18:
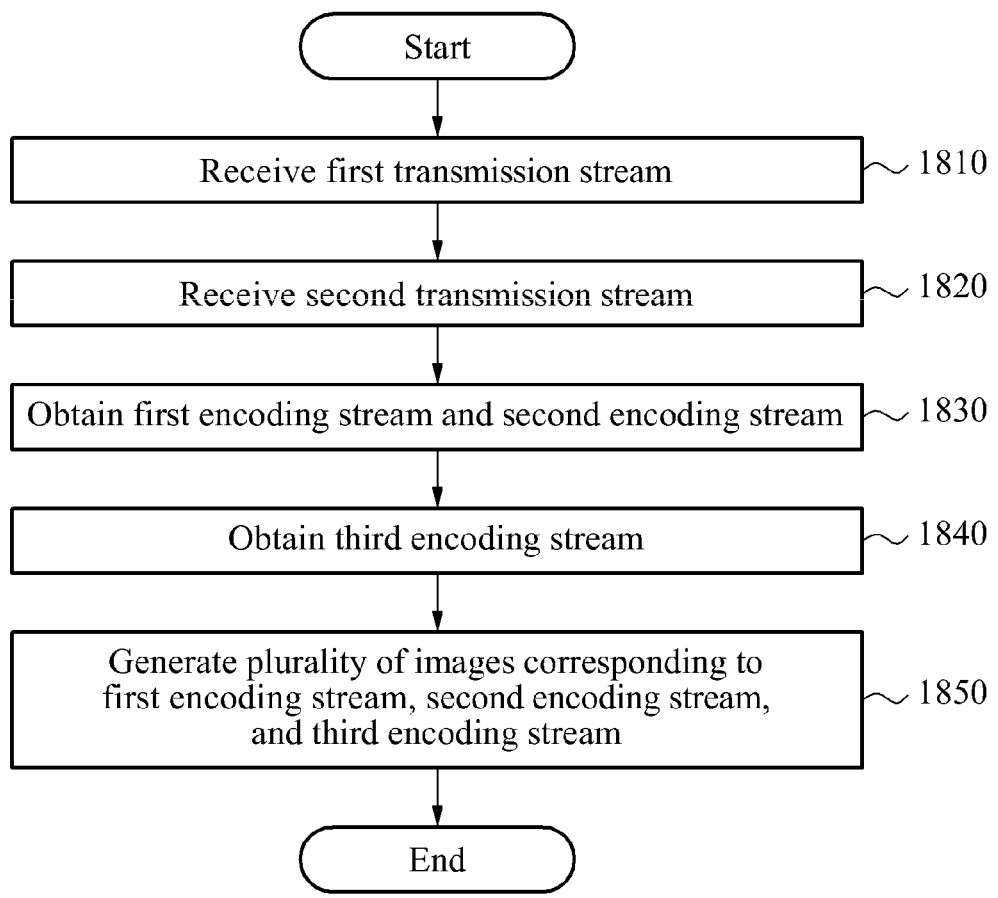
FIG. 18 is a flowchart illustrating a second reception method of receiving a realistic broadcasting image including a UHD image according to an embodiment of the present invention.

FIG. 18 is a flowchart illustrating a second reception method of receiving a realistic broadcasting image including a UHD image according to an embodiment of the present invention.

Referring to FIG. 18, in operation 1810, a method according to the present exemplary embodiment includes receiving a first transmission stream via a first transmission channel. The receiving of the first transmission stream includes generating the first transmission stream by channel decoding a signal received via the first transmission channel.

Also, in operation 1820, the method according to the present exemplary embodiment includes receiving a second transmission stream via a second transmission channel. In this example, the receiving of the second transmission stream includes generating the second transmission stream by channel decoding a signal received via the second transmission channel.

Further, in operation 1830, the method according to the present exemplary embodiment includes generating the first encoding stream and the second encoding stream by separating the first transmission stream.

In operation 1840, the method according to the present exemplary embodiment includes generating a third encoding stream from the second transmission stream.

In operation 1850, the method according to the present exemplary embodiment includes generating an HD image corresponding to the first encoding stream from the first encoding stream, generating a semi-UHD image from the first encoding stream and the second encoding stream, and generating a UHD image from the first encoding stream, the second encoding stream, and the third encoding stream.

Figure 19:
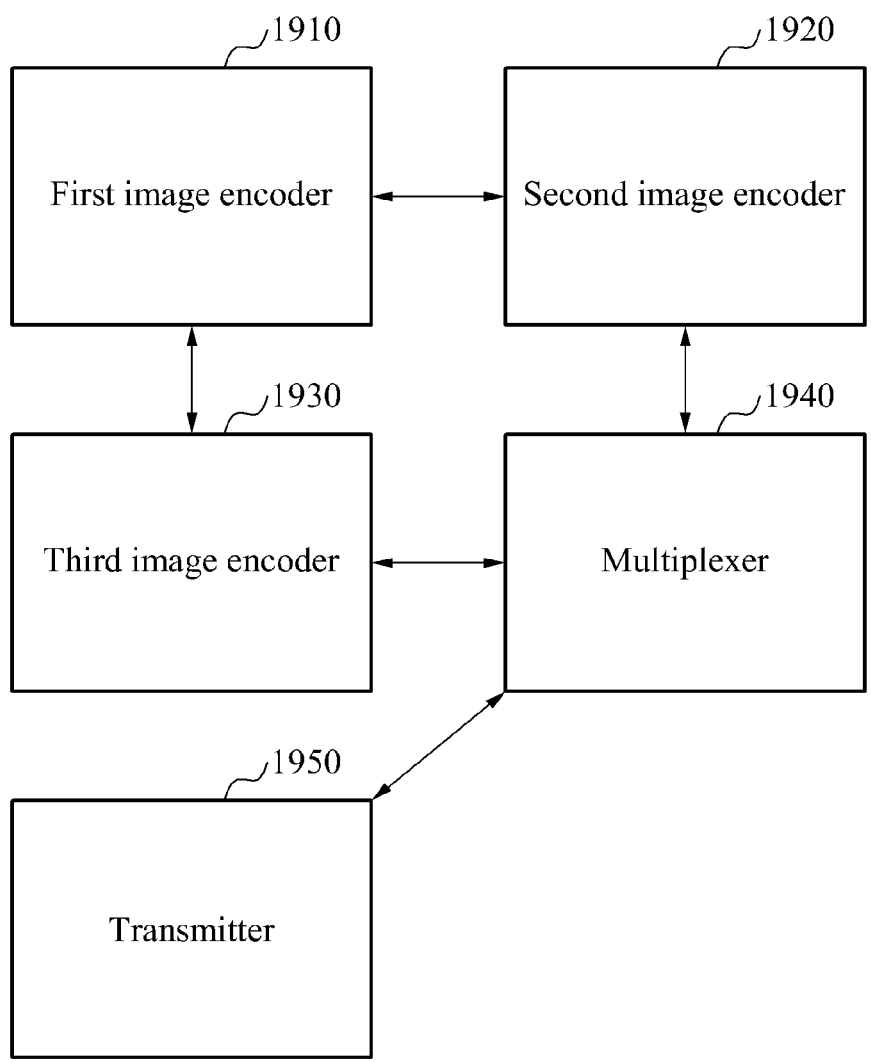
FIG. 19 is a block diagram illustrating a second transmission system for transmitting a realistic broadcasting image including a UHD image according to an embodiment of the present invention.

FIG. 19 is a block diagram illustrating a second transmission system for transmitting a realistic broadcasting image including a UHD image according to an embodiment of the present invention.

Referring to FIG. 19, the second transmission system includes a first image encoder 1910, a second image encoder 1920, a third image encoder 1930, a multiplexer 1940, and a transmitter 1950.

The first image encoder 1910 generates a first encoding stream from an HD image.

The second image encoder 1920 generates a second encoding stream from at least one of a UHD image and an image restored from the first encoding stream.

The third image encoder 1930 generates a third encoding stream from at least one of a UHD image and an image restored from the second encoding stream.

The multiplexer 1940 generates a first transmission stream by applying at least one of packetization, synchronization, and multiplexing to the first encoding stream and the second encoding stream, and generates a second transmission stream by applying at least one of packetization and synchronization to the third encoding stream.

The transmitter 1950 transmits the first transmission stream via a first transmission channel, and transmits the second transmission stream via a second transmission channel having a relatively lower transmission capacity than the first transmission channel.

Figure 20:
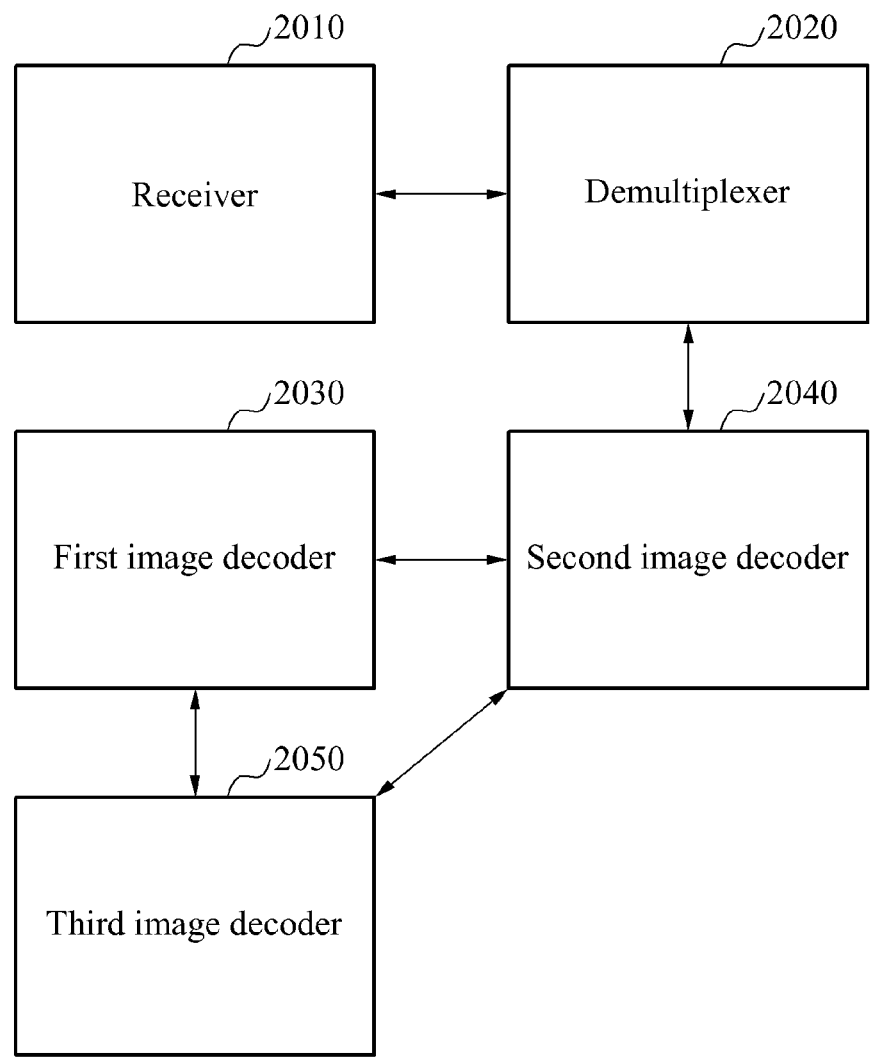
FIG. 20 is a block diagram illustrating a second reception system for receiving a realistic broadcasting image including a UHD image according to an embodiment of the present invention.

FIG. 20 is a block diagram illustrating a second reception system for receiving a realistic broadcasting image including a UHD image according to an embodiment of the present invention.

Referring to FIG. 20, the second reception system includes a receiver 2010, a demultiplexer 2020, a first image decoder 2030, a second image decoder 2040, and a third image decoder 2050.

The receiver 2010 receives a first transmission stream via a first transmission channel, and receives a second transmission stream via a second transmission channel.

The demultiplexer 2020 generates a first encoding stream and a second encoding stream by separating the first transmission stream, and generates a third encoding stream from the second transmission stream.

The first image decoder 2030 generates an HD image from the first encoding stream.

The second image decoder 2040 generates another HD image from the first encoding stream and the second encoding stream.

The third image decoder 2050 generates a UHD image from the first encoding stream, the second encoding stream, and the third encoding stream.

Figure 21:
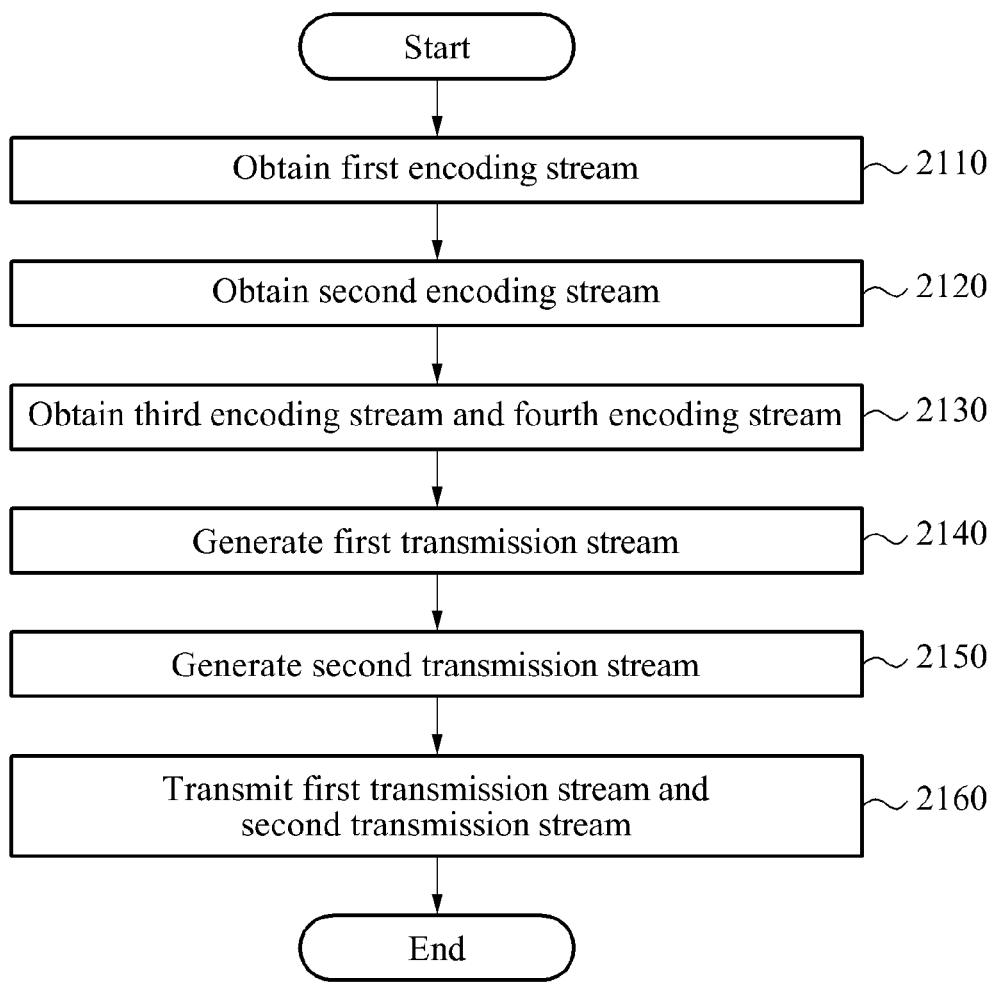
FIG. 21 is a flowchart illustrating a third transmission method of transmitting a realistic broadcasting image including a UHD image according to an embodiment of the present invention.

FIG. 21 is a flowchart illustrating a third transmission method of transmitting a realistic broadcasting image including a UHD image according to an embodiment of the present invention.

Referring to FIG. 21, in operation 2110, a method according to the present exemplary embodiment includes generating a first encoding stream from an HD image. In this example, the generating of the first encoding stream includes reducing a resolution of a UHD image, obtaining an HD image, and encoding the HD image.

Also, in operation 2120, the method according to the present exemplary embodiment includes generating a second encoding stream from at least one of the UHD image and an image restored from the first encoding stream. Also, the generating of the second encoding stream includes decoding an image corresponding to the first encoding stream, generating a decoded image, expanding a resolution of the decoded image, converting a scanning method as necessary, obtaining a restored UHD image differing from the UHD image, and reference encoding the restored UHD image and the UHD image based on an inter-picture prediction method.

Further, in operation 2130, the method according to the present exemplary embodiment includes generating a third encoding stream and a fourth encoding stream by separating the second encoding stream.

In operation 2140, the method according to the present exemplary embodiment includes generating a first transmission stream by applying at least one of packetization, synchronization, and multiplexing to the first encoding stream and the third encoding stream. In this example, the generating of the first transmission stream includes performing error correction decoding on the first transmission stream.

In operation 2150, the method according to the present exemplary embodiment includes generating a second transmission stream by applying at least one of packetization and synchronization to the fourth encoding stream. In this example, the generating of the second transmission stream includes performing error correction encoding on the second transmission stream.

In operation 2160, the method according to the present exemplary embodiment includes transmitting the first transmission stream via a first transmission channel, and transmitting the second transmission stream via a second transmission channel having a relatively lower transmission capacity than the first transmission channel.

Figure 22:
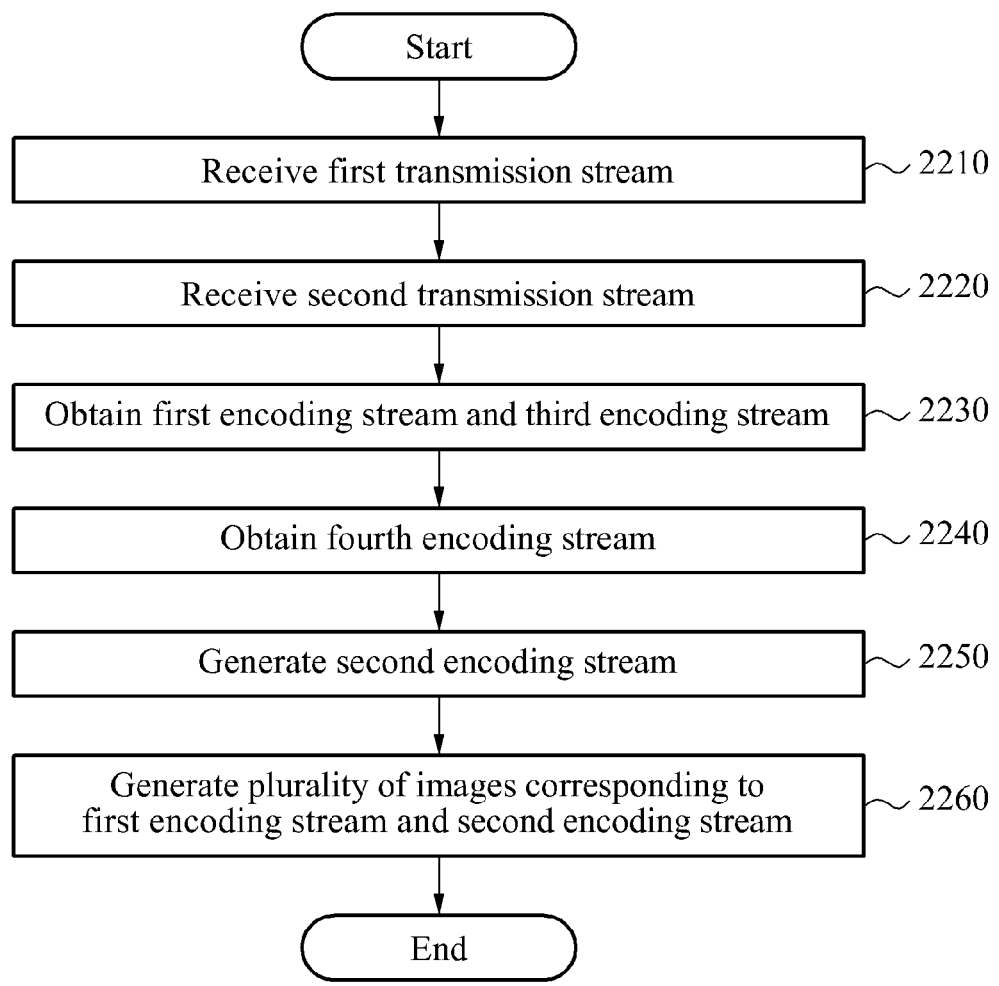
FIG. 22 is a flowchart illustrating a third reception method of receiving a realistic broadcasting image including a UHD image according to an embodiment of the present invention.

FIG. 22 is a flowchart illustrating a third reception method of receiving a realistic broadcasting image including a UHD image according to an embodiment of the present invention.

Referring to FIG. 22, in operation 2210, the method according to the present exemplary embodiment includes receiving a first transmission stream via a first transmission channel.

Also, in operation 2220, the method according to the present exemplary embodiment includes receiving a second transmission stream via a second transmission channel.

In operation 2230, the method according to the present exemplary embodiment includes generating a first encoding stream and a third encoding stream by separating the first transmission stream.

In operation 2240, the method according to the present exemplary embodiment includes generating a fourth encoding stream from the second transmission stream.

In operation 2250, the method according to the present exemplary embodiment includes generating the second encoding stream by combining the third encoding stream and the fourth encoding stream.

In operation 2260, the method according to the present exemplary embodiment includes generating an HD image from the first encoding stream, and generating a UHD image from the first encoding stream and the second encoding stream.

Figure 23:
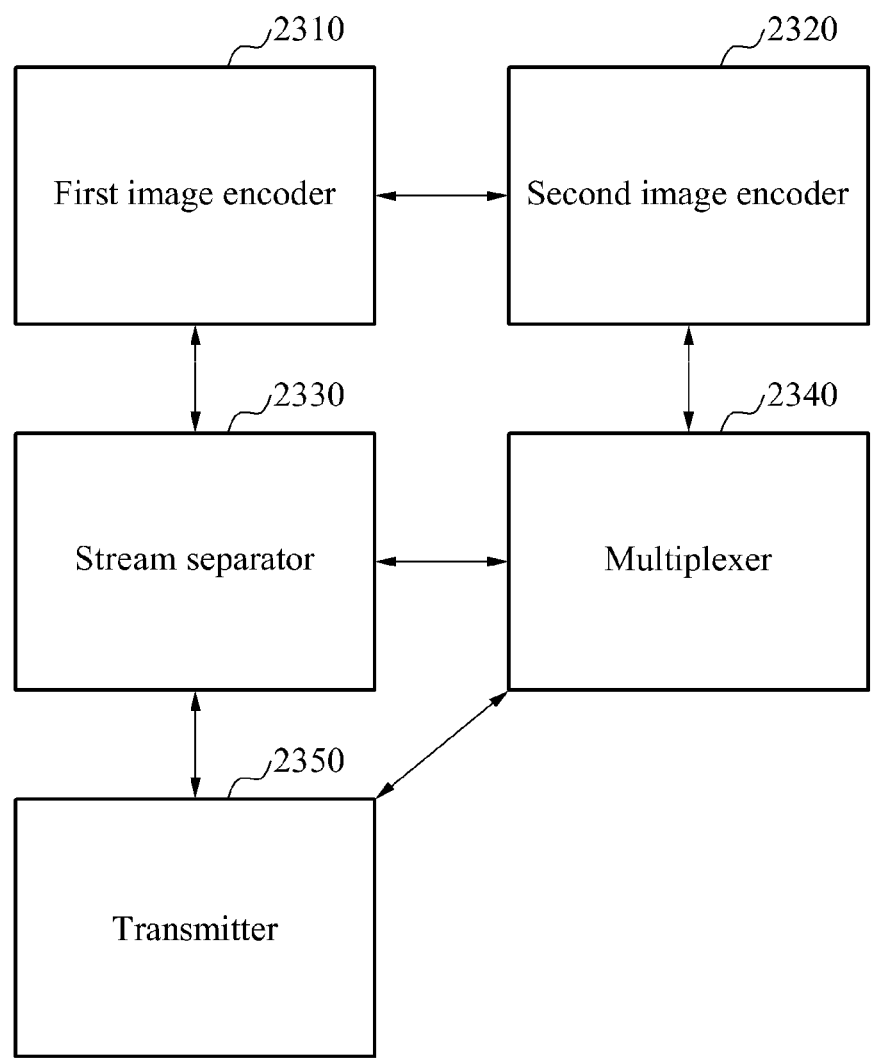
FIG. 23 is a block diagram illustrating a third transmission system for transmitting a realistic broadcasting image including a UHD image according to an embodiment of the present invention.

FIG. 23 is a block diagram illustrating a third transmission system for transmitting a realistic broadcasting image including a UHD image according to an embodiment of the present invention.

Referring to FIG. 23, the third transmission system includes a first image encoder 2310, a second image encoder 2320, a stream separator 2330, a multiplexer 2340, and a transmitter 2350.

The first image encoder 2310 generates a first encoding stream from an HD image.

The second image encoder 2320 generates a second encoding stream from at least one of a UHD image and an image restored from the first encoding stream.

The stream separator 2330 generates a third encoding stream and a fourth encoding stream by separating the second encoding stream.

The multiplexer 2340 generates a first transmission stream by applying at least one of packetization, synchronization, and multiplexing to the first encoding stream and the third encoding stream, and generates a second transmission stream by applying at least one of packetization and synchronization to the fourth encoding stream.

The transmitter 2350 transmits the first transmission stream via a first transmission channel, and transmits the second transmission stream via a second transmission channel having a relatively lower transmission capacity than the first transmission channel.

Figure 24:
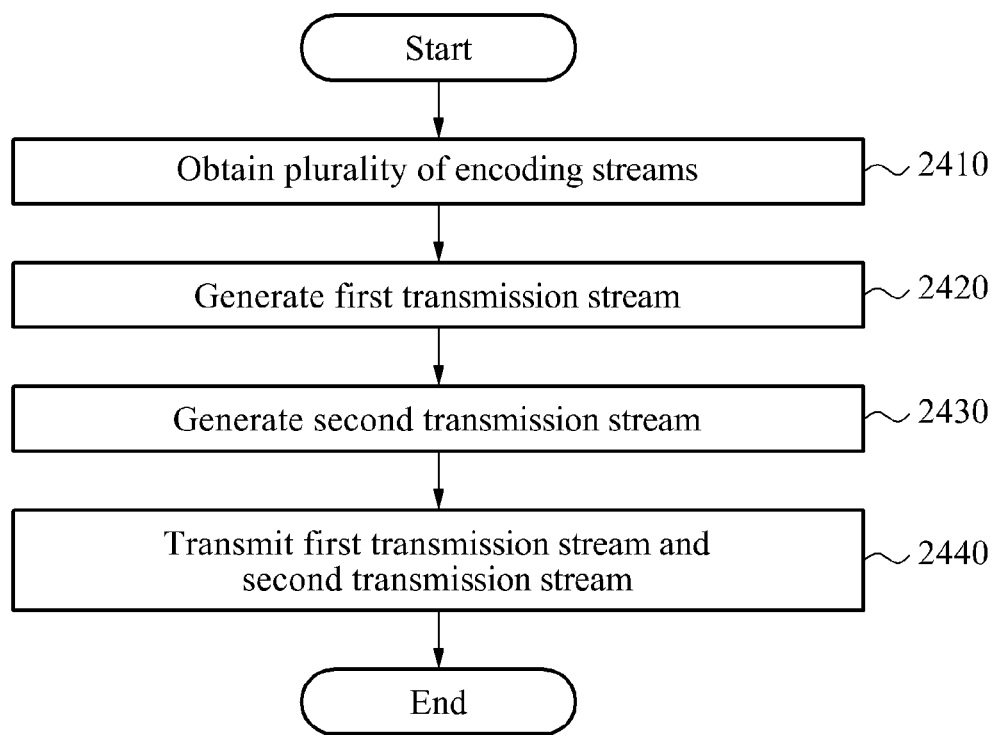
FIG. 24 is a flowchart illustrating a transmission method of transmitting a realistic broadcasting image including a 3D image and a panorama image according to an embodiment of the present invention.

FIG. 24 is a flowchart illustrating a transmission method of transmitting a realistic broadcasting image including a 3D image and a panorama image according to an embodiment of the present invention.

Referring to FIG. 24, in operation 2410, a method according to the present exemplary embodiment includes generating a plurality of encoding streams corresponding to a plurality of images included in at least one of a 3D image and a panorama image from the plurality of images.

Also, in operation 2420, the method according to the present exemplary embodiment includes generating a first transmission stream by applying at least one of packetization, synchronization, and multiplexing to a first encoding stream group extracted, from the plurality of encoding streams, based on predetermined conditions.

Further, in operation 2430, the method according to the present exemplary embodiment includes generating a second transmission stream by applying at least one of packetization and synchronization to a second encoding stream group extracted, from the plurality of encoding streams, to differ from the first encoding stream.

In operation 2440, the method according to the present exemplary embodiment includes transmitting the first transmission stream via a first transmission channel, and transmitting the second transmission stream via a second transmission channel having a relatively lower transmission capacity than the first transmission channel.

Figure 25:
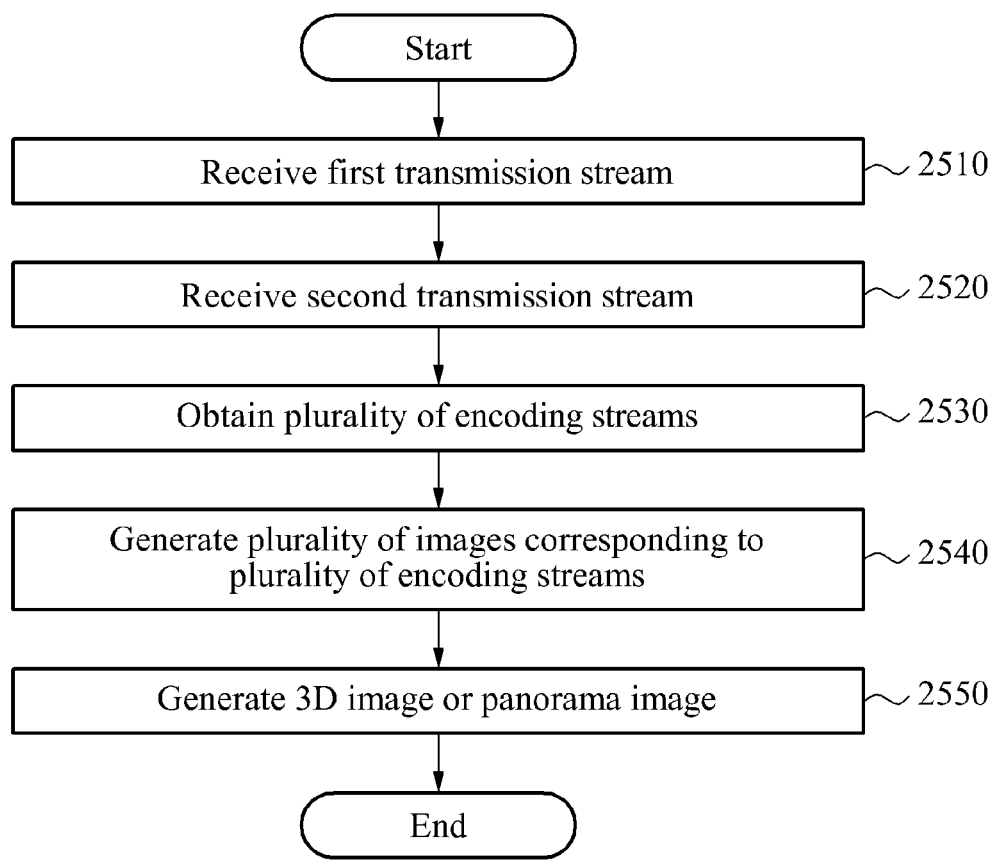
FIG. 25 is a flowchart illustrating a reception method of receiving a realistic broadcasting image including a 3D image and a panorama image according to an embodiment of the present invention.

FIG. 25 is a flowchart illustrating a reception method of receiving a realistic broadcasting image including a 3D image and a panorama image according to an embodiment of the present invention.

Referring to FIG. 25, in operation 2510, the method according to the present exemplary embodiment includes receiving a first transmission stream via a first transmission channel.

Also, in operation 2520, the method according to the present exemplary embodiment includes receiving a second transmission stream via a second transmission channel.

In operation 2530, the method according to the present exemplary embodiment includes obtaining a plurality of encoding streams from a first transmission stream and a second transmission stream.

In operation 2540, the method according to the present exemplary embodiment includes generating a plurality of images corresponding to the plurality of encoding streams.

In operation 2550, the method according to the present exemplary embodiment includes generating at least one of a 3D image and a panorama image by combining the plurality of images.

Figure 26:
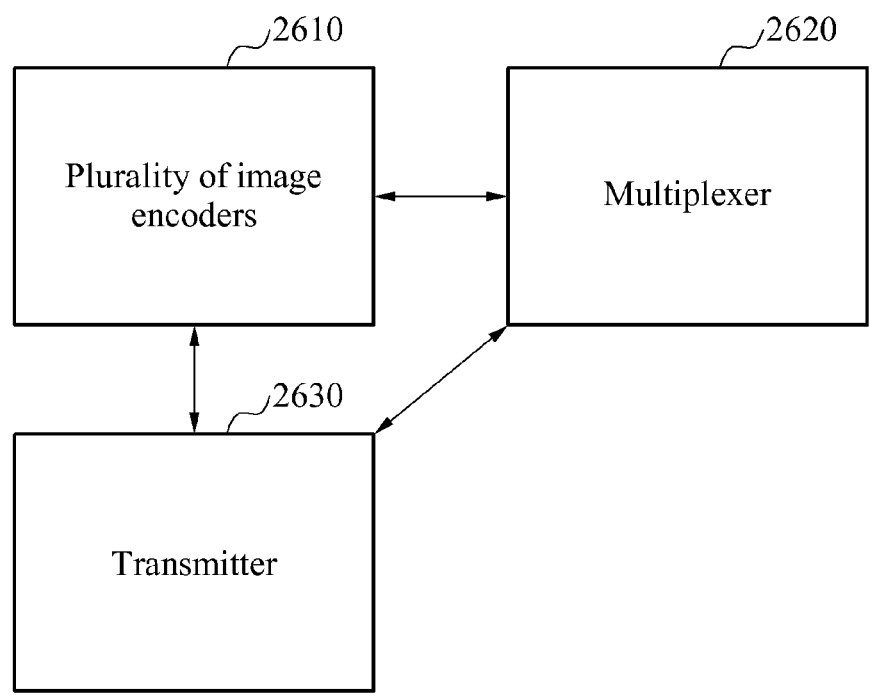
FIG. 26 is a block diagram illustrating a transmission system for transmitting a realistic broadcasting image including a 3D image and a panorama image according to an embodiment of the present invention.

FIG. 26 is a block diagram illustrating a transmission system for transmitting a realistic broadcasting image including a 3D image and a panorama image according to an embodiment of the present invention.

Referring to FIG. 26, the transmission system includes a plurality of image encoders 2610, a multiplexer 2620, and a transmitter 2630.

The plurality of image encoders 2610 generates a plurality of encoding streams corresponding to a plurality of images from the plurality of images included in at least one of a 3D image and a panorama image.

The multiplexer 2620 generates a first transmission stream by applying at least one of packetization, synchronization, and multiplexing to a first encoding stream group extracted, from the plurality of encoding streams, based on predetermined conditions, and generates a second transmission stream by applying at least one of packetization and synchronization to a second encoding stream group extracted, from the plurality of encoding streams, to differ from the first encoding stream group.

The transmitter 2630 transmits the first transmission stream via a first transmission channel, and transmits the second transmission stream via a second transmission channel having a relatively lower transmission capacity than the first transmission channel.

According to an aspect of the present invention, there is provided a method, an apparatus, and a system that concurrently provide an HD image and a UHD image by appropriately distributing and transmitting a plurality of encoding streams corresponding to a plurality of UHD images via a first transmission channel and a second transmission channel.

According to another aspect of the present invention, there is provided a method, an apparatus, and a system that use an HD image obtained by reducing a resolution of a UHD image during a process of appropriately distributing a plurality of encoding streams corresponding to a plurality of UHD images.

According to still another aspect of the present invention, there is provided a method, an apparatus, and a system that concurrently provide an HD image and a UHD image by receiving a plurality of encoding streams corresponding to a plurality of appropriately distributed UHD images via a first transmission channel and a second transmission channel.

According to yet another aspect of the present invention, there is provided a method, an apparatus, and a system that concurrently provide an HD image together with a 3D image or a panorama image by appropriately distributing and transmitting a plurality of encoding streams corresponding to the 3D image or the panorama image via a first transmission channel and a second transmission channel.

According to further another aspect of the present invention, there is provided a method, an apparatus, and a system that concurrently provide an HD image together with a 3D image or a panorama image by receiving a plurality of encoding streams corresponding to a plurality of appropriately distributed 3D images or panorama images via a first transmission channel and a second transmission channel.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of providing a realistic broadcasting image including an ultra high definition (UHD) image, the method comprising:
   generating a first encoding stream from a high definition (HD) image;
   generating a second encoding stream from a UHD image and an image restored from the first encoding stream;
   generating a decoded image by decoding the first or second encoding stream;
   obtaining a restored UHD image, differing from the UHD image, by expanding a resolution of the decoded image and converting a scanning method when a scanning method of the decoded image is different from a scanning method of the UHD image;
   generating a third encoding stream from the UHD image and an image restored from the second encoding stream;
   generating a first transmission stream by applying at least one of packetization, synchronization, and multiplexing to the first encoding stream and the second encoding stream;
   generating a second transmission stream by applying at least one of packetization and synchronization to the third encoding stream;
   transmitting the first transmission stream via a first transmission channel; and
   transmitting the second transmission stream via a second transmission channel having a lower transmission capacity than the first transmission channel.

2. The method of claim 1, further including:
   obtaining the HD image by reducing a resolution of the UHD image.

3. The method of claim 1, wherein generating the second encoding stream comprises:

generating the second encoding stream by reference encoding the restored UHD image and the UHD image based on an inter-picture prediction method.

4. The method of claim 1, wherein generating the third encoding stream comprises:
generating a decoded image by decoding the second encoding stream; and
generating the third encoding stream by reference encoding the decoded image and the UHD image.

5. The method of claim 1, wherein generating the second encoding stream comprises:
obtaining the HD image by reducing the resolution of the UHD image;
generating a decoded image by decoding the first encoding stream; and
generating the second encoding stream by reference encoding the decoded image and the HD image.

6. The method of claim 1, wherein generating the third encoding stream comprises:
generating the third encoding stream by reference encoding the restored UHD image and the UHD image.

7. The method of claim 1, further comprising:
performing error correction encoding on each of the first transmission stream and the second transmission stream.

8. The method of claim 1, further comprising:
receiving the first transmission stream via the first transmission channel;
receiving the second transmission stream via the second transmission channel;
generating the first encoding stream and the second encoding stream by separating the first transmission stream;
generating the third encoding stream from the second transmission stream;
generating receiving the first transmission stream comprises generating the first transmission stream by channel decoding a signal received via the first transmission channel, and
receiving the second transmission stream comprises generating the second transmission stream by channel decoding a signal received via the second transmission channel.

9. The method of claim 8, wherein receiving the first transmission stream comprises generating the first transmission stream by channel decoding a signal received via the first transmission channel, and
receiving the second transmission stream comprises generating the second transmission stream by channel decoding a signal received via the second transmission channel.

10. A method of providing a realistic broadcasting image including an ultra high definition (UHD) image, the method comprising:
generating a first encoding stream from a high definition (HD) image;
generating a decoded image by decoding the first encoding stream;
obtaining a restored UHD image, differing from the UHD image, by expanding a resolution of the decoded image and converting a scanning method when a scanning method of the decoded image is different from a scanning method of the UHD image;
generating a second encoding stream from a UHD image and an image restored from the first encoding stream;
generating a third encoding stream and a fourth encoding stream by separating the second encoding stream;

generating a first transmission stream by applying at least one of packetization, synchronization, and multiplexing to the first encoding stream and the third encoding stream;
generating a second transmission stream by applying at least one of packetization and synchronization to the fourth encoding stream;
transmitting the first transmission stream via a first transmission channel; and
transmitting the second transmission stream via a second transmission channel having a lower transmission capacity than the first transmission channel.

11. The method of claim 10, wherein generating the first encoding stream comprises:
obtaining the HD image by reducing a resolution of the UHD image; and
generating the first encoding stream by encoding the HD image.

12. The method of claim 10, wherein generating of second encoding stream comprises:
generating the second encoding stream by reference encoding the restored UHD image and the UHD image based on an inter-picture prediction method.

13. The method of claim 10, wherein generating the first transmission stream further comprises performing error correction encoding on the first transmission stream, and
generating the second transmission stream further comprises performing error correction encoding on the second transmission stream.

14. The method of claim 10, further comprising:
receiving the first transmission stream via the first transmission channel;
receiving the second transmission stream via the second transmission channel;
generating the first encoding stream and the third encoding stream by separating the first transmission stream;
generating the fourth encoding stream from the second transmission stream;
generating the second encoding stream by combining the third encoding stream and the fourth encoding stream;
generating the HD image from the first encoding stream; and
generating the UHD image from the first encoding stream and the second encoding stream.

15. A method of providing a realistic broadcasting image including a three-dimensional (3D) image, a panorama image, or both, the method comprising:
generating a plurality of encoding streams corresponding to a plurality of images from the plurality of images included in at least one of a 3D image and a panorama image, including generating a first encoding stream from a first image, generating a second encoding stream from a second image, and generating a third encoding stream from a third image and a restored image, wherein the restored image is obtained by decoding the second encoding stream;
generating a first transmission stream by applying at least one of packetization, synchronization, and multiplexing to the first and second encoding streams;
generating a second transmission stream by applying at least one of packetization and synchronization to the third encoding stream;
transmitting the first transmission stream via a first transmission channel; and
transmitting the second transmission stream via a second transmission channel having a lower transmission capacity than the first transmission channel.

16. The method of claim 15, further comprising:
receiving the first transmission stream via the first transmission channel;
receiving the second transmission stream via the second transmission channel;
obtaining the plurality of encoding streams from the first transmission stream and the second transmission stream;
generating the plurality of images corresponding to the plurality of encoding streams; and
generating at least one of the 3D image and the panorama image by combining the plurality of images.

17. A system for providing a realistic broadcasting image including an ultra high definition (UHD) image, the system comprising:
a first image encoder configured to generate a first encoding stream from a high definition (HD) image;
a second image encoder configured to generate a second encoding stream from a UHD image and an image restored from the first encoding stream;
a decoder configured to generate a decoded image by decoding the first or second encoding stream;
an up-scaler configured to obtain a restored UHD image, differing from the UHD image, by expanding a resolution of the decoded image and converting a scanning method when a scanning method of the decoded image is different from a scanning method of the UHD image;
a third image encoder configured to generate a third encoding stream from the UHD image and an image restored from the second encoding stream;
a multiplexer configured to generate a first transmission stream by applying at least one of packetization, synchronization, and multiplexing to the first encoding stream and the second encoding stream, and generate a second transmission stream by applying at least one of packetization and synchronization to the third encoding stream; and
a transmitter configured to transmit the first transmission stream via a first transmission channel, and transmit the second transmission stream via a second transmission channel having a lower transmission capacity than the first transmission channel.

18. The system of claim 17, further comprising:
a receiver configured to receive the first transmission stream via the first transmission channel, and receive the second transmission stream via the second transmission channel;
a demultiplexer configured to generate the first encoding stream and the second encoding stream by separating the first transmission stream, and generate the third encoding stream from the second transmission stream;
a first image decoder configured to generate a first HD image from the first encoding stream;
a second image decoder configured to generate at least one of a semi-UHD image and a second HD image differing from the first HD image from the first encoding stream and the second encoding stream; and
a third image decoder configured to generate the UHD image from the first encoding stream, the second encoding stream, and the third encoding stream.

19. A system for providing a realistic broadcasting image including an ultra high definition (UHD) image, the system comprising:
a first image encoder configured to generate a first encoding stream from a high definition (HD) image;
a decoder configured to generate a decoded image by decoding the first encoding stream;
an up-scaler configured to obtain a restored UHD image, differing from the UHD image, by expanding a resolution of the decoded image and converting a scanning method when a scanning method of the decoded image is different from a scanning method of the UHD image;
a second image encoder configured to generate a second encoding stream from a UHD image and an image restored from the first encoding stream;
a stream separator configured to generate a third encoding stream and a fourth encoding stream by separating the second encoding stream;
a multiplexer configured to generate a first transmission stream by applying at least one of packetization, synchronization, and multiplexing to the first encoding stream and the third encoding stream, and generate a second transmission stream by applying at least one of packetization and synchronization to the fourth encoding stream; and
a transmitter configured to generate the first transmission stream via a first transmission channel, and transmit the second transmission stream via a second transmission channel having a lower transmission capacity than the first transmission channel.

20. A system for providing a realistic broadcasting image including a three-dimensional (3D) image and a panorama image, the system comprising:
a plurality of image encoders configured to generate a plurality of encoding streams corresponding to a plurality of images from the plurality of images included in at least one of a 3D image and a panorama image, the plurality of encoding streams including a first encoding stream generated from a first image, a second encoding stream generated from a second image, and a third encoding stream generated from a third image and a restored image obtained by decoding the second encoding stream;
a multiplexer configured to generate a first transmission stream by applying at least one of packetization, synchronization, and multiplexing to the first and second encoding streams, and generate a second transmission stream by applying at least one of packetization and synchronization to the third encoding stream; and
a transmitter configured to transmit the first transmission stream via the first transmission channel, and transmit the second transmission stream via a second transmission channel having a lower transmission capacity than the first transmission channel.

* * * * *